US011968281B2

(12) United States Patent
Klein et al.

(10) Patent No.: US 11,968,281 B2
(45) Date of Patent: *Apr. 23, 2024

(54) DISTRIBUTED MACHINE-LEARNING RESOURCE SHARING AND REQUEST ROUTING

(71) Applicant: Avago Technologies International Sales Pte. Limited, Singapore (SG)

(72) Inventors: Philippe Klein, Jerusalem (IL); Gordon Yong Li, San Diego, CA (US); Xuemin Chen, Rancho Santa Fe, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,007

(22) Filed: Sep. 13, 2022

(65) Prior Publication Data

US 2023/0020939 A1 Jan. 19, 2023

Related U.S. Application Data

(63) Continuation of application No. 17/155,780, filed on Jan. 22, 2021, now Pat. No. 11,516,311.

(51) Int. Cl.
*H04L 67/63* (2022.01)
*G06N 5/04* (2023.01)
(Continued)

(52) U.S. Cl.
CPC .............. *H04L 67/63* (2022.05); *G06N 5/04* (2013.01); *G06N 20/00* (2019.01); *H04L 67/10* (2013.01)

(58) Field of Classification Search
CPC ........ H04L 41/16; H04L 67/63; H04L 67/10; G06N 20/00; G06N 5/04; G06N 3/044;
(Continued)

(56) References Cited

U.S. PATENT DOCUMENTS 5,805,072 A * 9/1998 Kakemizu ............. H04L 47/724
370/408
6,917,625 B1 * 7/2005 Brush .................. H04Q 3/0029
379/230
(Continued)

FOREIGN PATENT DOCUMENTS

EP 3754915 A1 12/2020

OTHER PUBLICATIONS

Extended European Search Report (EP 23196917.1), dated Nov. 7, 2023, 8 pages.

*Primary Examiner* — Michael Won
(74) *Attorney, Agent, or Firm* — Quarles & Brady LLP

(57) ABSTRACT

Various embodiments of the present disclosure improve existing multi-layer and other network technologies by routing and processing client requests that require machine learning based on the machine learning capabilities of each network device and/or other computer resource characteristics of different network devices. This ensures that network latency and throughput, among other computer resource consumption characteristics, will be improved as machine learning processing can occur at the most suitable network device or be distributed among various suitable network devices.

18 Claims, 24 Drawing Sheets

(51) Int. Cl.
*G06N 20/00* (2019.01)
*H04L 67/10* (2022.01)

(58) Field of Classification Search
CPC .......... G06N 3/048; G06N 3/045; G06N 3/08; H04N 21/251; H04N 21/466; H04N 21/45; H04N 21/4662; G06F 7/023; G06F 18/241
See application file for complete search history.

(56) References Cited

U.S. PATENT DOCUMENTS

| | | | |
|---|---|---|---|
| 10,785,177 B1* | 9/2020 | Walters | H04L 51/212 |
| 11,556,839 B1* | 1/2023 | Vona | G06F 16/2365 |
| 2008/0193010 A1* | 8/2008 | Eaton | G06V 20/52 |
| | | | 382/159 |
| 2013/0298030 A1* | 11/2013 | Nahumi | H04W 4/023 |
| | | | 715/733 |
| 2014/0270494 A1* | 9/2014 | Sawhney | G06F 18/217 |
| | | | 382/159 |
| 2014/0358828 A1* | 12/2014 | Phillipps | G06N 20/00 |
| | | | 706/12 |
| 2015/0077550 A1* | 3/2015 | Apelbaum | G06F 18/251 |
| | | | 348/143 |
| 2016/0291127 A1* | 10/2016 | Huang | G01S 5/10 |
| 2017/0279682 A1* | 9/2017 | Dawson | H04L 67/12 |
| 2017/0324813 A1* | 11/2017 | Jain | H04L 41/5009 |
| 2018/0129978 A1* | 5/2018 | Vigoda | G06N 5/046 |
| 2018/0288063 A1* | 10/2018 | Koottayi | G06F 21/50 |
| 2018/0332117 A1* | 11/2018 | Street | H04W 12/35 |
| 2018/0336493 A1* | 11/2018 | Hayes | G06N 7/01 |
| 2018/0349201 A1* | 12/2018 | Clark | G06F 9/451 |
| 2019/0102574 A1* | 4/2019 | Roberts | G06F 16/23 |
| 2019/0102827 A1* | 4/2019 | Foster | G06Q 30/0641 |
| 2019/0140958 A1* | 5/2019 | Hasani | H04L 41/0893 |
| 2019/0141536 A1* | 5/2019 | Bachmutsky | H04L 67/10 |
| 2019/0318240 A1* | 10/2019 | Kulkarni | G06N 3/08 |
| 2019/0349426 A1* | 11/2019 | Smith | H04L 61/4505 |
| 2019/0391796 A1* | 12/2019 | Brady | G06F 8/458 |
| 2019/0392296 A1* | 12/2019 | Brady | G06N 3/063 |
| 2020/0312153 A1* | 10/2020 | Thakur | G05D 1/0297 |
| 2020/0320349 A1* | 10/2020 | Yu | H04L 9/3236 |
| 2020/0334567 A1 | 10/2020 | Bhattacharjee et al. | |
| 2020/0394455 A1* | 12/2020 | Lee | G06Q 40/08 |
| 2020/0403944 A1* | 12/2020 | Joshi | G06F 9/547 |
| 2021/0073376 A1* | 3/2021 | Tran | G06N 3/082 |
| 2021/0073677 A1* | 3/2021 | Peterson | G06N 20/00 |
| 2021/0142259 A1* | 5/2021 | Kalia | G06Q 10/063112 |
| 2021/0191759 A1* | 6/2021 | Fong | G06F 9/4881 |
| 2022/0092412 A1* | 3/2022 | Srivastava | H04L 67/10 |
| 2022/0129787 A1* | 4/2022 | Vogeti | G06F 8/60 |

\* cited by examiner

DISTRIBUTED MACHINE-LEARNING RESOURCE SHARING AND REQUEST ROUTING

CROSS REFERENCE TO RELATED APPLICATIONS

This application is a continuation of U.S. patent application Ser. No. 17/155,780, filed Jan. 22, 2021, by Philippe Klein et al. and titled, "Distributed Machine-Learning Resource Sharing and Request Routing", which is hereby incorporated by reference in its entirety for all purposes.

BACKGROUND

Multi-layered computer networks include multiple layers of multiple networks or devices that interact with each other to service client requests. For example, Broadband Access Networks can include an Internet of Things (IoT) layer of IoT devices (e.g., a smart television or a sensor), a customer-premises equipment (CPE) layer of telecommunications hardware typically located in a home or business of a customer (e.g., residential gateways, set top boxes, etc.), an edge layer of devices (e.g., mobile devices, micro servers, etc.) where the customer resides (or closer to the customer or IoT device relative to the cloud) and which controls and processes data at the boundary between two or more networks, and a cloud layer of computing nodes in a data center that performs most of the heavy processing and computing. In order to service a client request, the request is typically routed to a device at each layer and then data is returned back to the IoT device.

Existing multi-layer computer networks and other computer networks do not provide functionality for sharing machine learning processing capabilities among each other and intelligently routing and processing client requests that require machine learning functionality. Moreover, existing technologies unnecessarily consume computing resources, such as memory, CPU, and network resources, among other things.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Particular embodiments improve existing multi-layer and other network functionalities by employing machine learning cores or modules across multiple network devices of a multi-layered network and sharing machine learning capabilities of such modules (and/or other computer resource characteristics) across the network so that an intelligent routing decision can be made at runtime to service client requests that require machine learning processing. The client requests include the machine learning data and control message transfers. Accordingly, some embodiments route and process client requests that require machine learning based on the machine learning capabilities (e.g., model type, hyperparameters) of each network device and/or other computer resource characteristics (e.g., memory availability. CPU utilization, etc.) of different network devices. This ensures that network latency and throughput, among other computer resource consumption characteristics, will be improved as machine learning processing can occur at the most suitable network device or be distributed among various suitable network devices.

BRIEF DESCRIPTION OF THE DRAWINGS

Aspects of the disclosure are described in detail below with reference to the attached drawing figures, wherein:

FIG. 2 is a schematic diagram of an example operating environment architecture for which some embodiments of the present disclosure are employed in;

FIG. 4 is a block diagram of an example operating environment for which embodiments of the present disclosure may be employed in;

DETAILED DESCRIPTION

Figure 1:
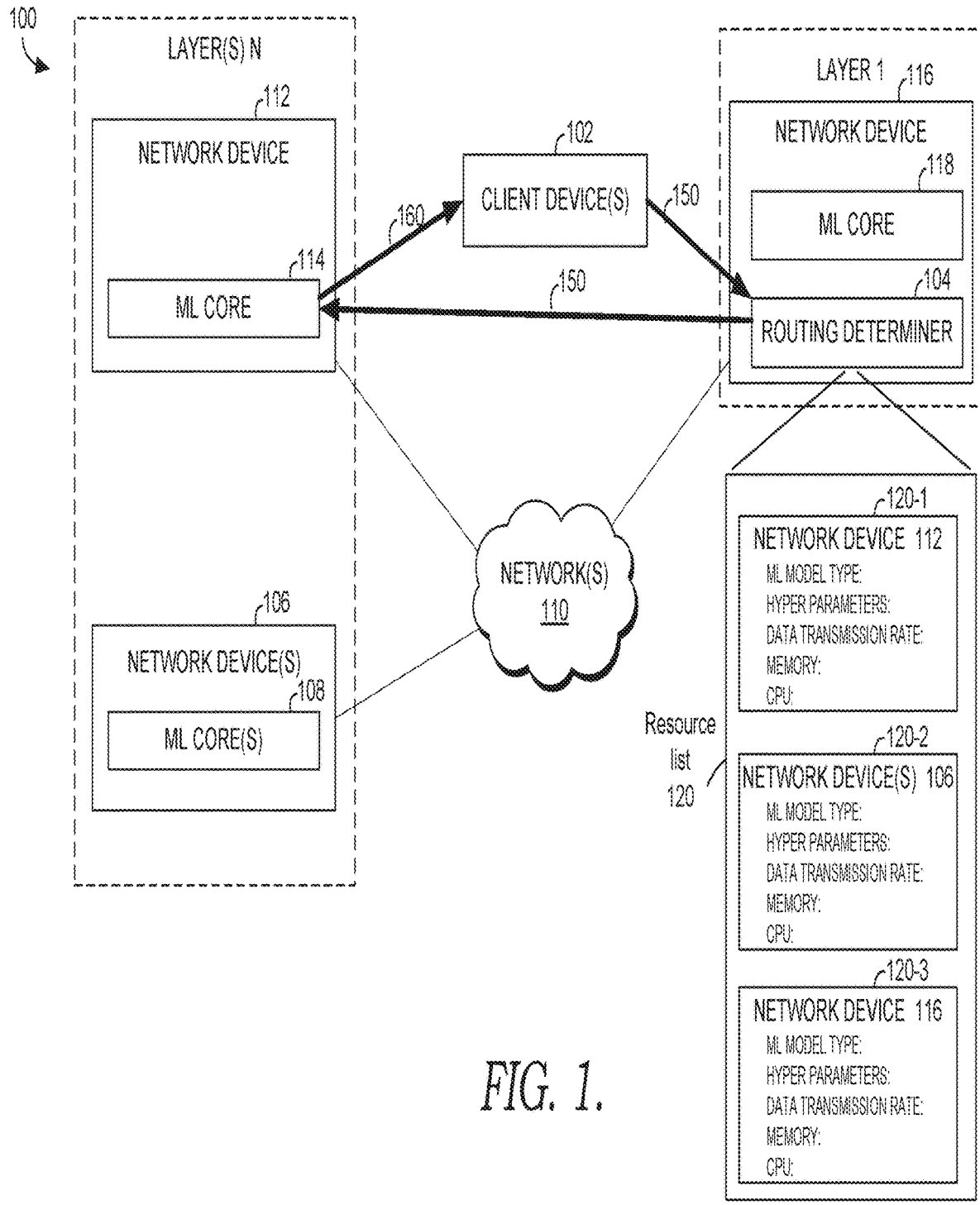
FIG. 1 is a block diagram of a computing environment suitable for use in implementing some embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a standalone application, a service or hosted service (standalone or in combination with another hosted service), or a plug-in to another product, to name a few.

Existing multi-layer computer networks and other computer networks do not provide functionality for sharing machine learning processing capabilities among each other. Although some higher level computing devices (e.g., cloud computing nodes) can perform machine learning processes, such processes are typically not adequately distributed among different layers, such as at the edge or in CPE devices. Consequently, throughput and network latency are negatively affected. For instance, client requests may have to hop from and to multiple devices at each layer of a Broadband Access Network before the request is finally processed at the cloud layer, which decreases the amount of bits per time slice that data is processed given all the packet generation costs in a TCP/IP protocol, for example. In general, other transport protocols also apply.

Existing multi-layer networks and other computer networks also do not adequately route and process client requests that require machine learning processing. Although existing computing systems can route client requests using load balancing, fault processing, fault tolerance, or other routing functionality, such routing functionality does not take into account machine learning capabilities of particular network devices.

Embodiments of the present disclosure provide one or more technical solutions to these problems with existing computer networks. In operation, various embodiments are directed employing machine learning cores or modules across multiple network devices of a multi-layered network and sharing capabilities of such modules across the network so that an intelligent routing decision can be made at runtime to service client requests. For example, various gateway and edge devices in a broadband access network may employ different machine learning models with different hyperparameters and broadcast (e.g., via a ML service advertisement) an indication of the machine learning models and hyperparameters to other network devices so that those other network devices can determine the machine learning capabilities or attributes of other network devices, relative to their own machine learning capabilities and attributes.

Some embodiments of the presents disclosure route and process client requests that require machine learning based on the machine learning capabilities of each network device and/or other computer resource characteristics of different network devices. For example, a client request may be to detect an object in a video stream. However, only certain network devices may employ the appropriate models (e.g., a CNN trained on images) to detect objects. And other network device employ different models that perform different functionality (e.g., a clustering model trained on malware signatures). Further, certain network devices may be busy or otherwise be subject to some computer resource utilization or consumption over a threshold (e.g., memory availability, CPU utilization, etc.). Accordingly, in this example, various embodiments of the present disclosure intelligently route the client requests to those network devices capable of object detection and/or network devices that are not subject to computer resource consumption over some threshold.

Various embodiments of the present disclosure improve existing multi-layered networks and other networks, which improves computer resource consumption. As described herein with existing network technologies, machine learning functionality is not distributed among different layers, such as at the edge or in CPE devices. These technologies also do not adequately route and process client requests that require machine learning processing. Consequently, throughput and network latency are negatively affected. However, because multiple network devices include machine learning cores or modules, the capability information (e.g., machine learning model type) of which is shared across the network to route clients request, throughput and latency is improved. This is because machine learning processing need not happen at one designated device or layer, such as the cloud layer. Further, computer resource characteristics (e.g., CPU, memory) can be determined for each network device to ensure that requests do not get routed to those network devices over some computer resource consumption threshold. For example, an entire client request can be processed at the edge based on a corresponding edge network device's machine learning capabilities being able to completely service the request. In this example, because the client request does not have to hop to each layer and it is processed at the edge near where the client resides, network latency, as well as throughput is greatly improved. In another example, where heavy machine learning processing is required, for example, a first portion of a client request can be processed by a machine learning core at a CPE layer based on a CPE device's machine learning capabilities and then a second portion of the request can be processed at the cloud layer so that different network devices can share machine learning processing (e.g., in parallel), which also improves network latency and throughput.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

The operating environment 100 enables the routing of a request 150 from the client device(s) 102 to the network device 112 for processing of the request via one or more machine learning functionalities, according to some embodiments. The operating environment 100 includes one or more client devices 102, a network device 112, a network device 116, and one or more network devices 106 (representing any quantity of network devices), each of which are communicatively coupled via the one or more networks 110.

The illustrative operating environment 100 shown in FIG. 1 is merely an example of one suitable operating environment and is not intended to suggest any limitation as to the scope of use or functionality of embodiments of the present invention. For example, in some embodiments the computing environment 100 includes or represents a cloud computing environment that includes a network-based, distributed/data processing system that provides one or more cloud computing services (e.g., IAAS, PAAS, and SAAS). Further, a cloud computing environment can include many computers (e.g., represented by the network devices), hundreds or thousands of them or more, disposed within one or more data centers and configured to share resources over the network(s) 110. In addition, a client device or a network device can be a module on the same device.

Additionally or alternatively, in some embodiments the operating environment 100 and the one or more network(s) 110 represent or include any multi-layered and/or hierarchical computer network. A "hierarchical computer network" as described herein refers to any computer network where data is generally routed and/or processed in some hierarchical order from one network device to another, although the exact network device to process the data is not necessarily predetermined. Examples of this include a broadband access network that includes residential routers, set-top boxes, and back-end servers, where data, for example, is first routed from a set-top box network device, then to a residential router network device, then to one or more back-end server network devices. Additionally or alternatively, the hierarchical computer network includes an Internet of Things (IoT) computing environment where data is processed first through a CPE layer, then an edge layer, then a cloud layer.

In various embodiments, a "layer" as described herein refers to a specific function (e.g., edge computing) that a specific type or category of network device (e.g., an edge computing device, as opposed to a cloud computing node) performs. In an IoT computing environment, for example, the layers can be an IoT device layer, CPE layer, edge layer, and cloud layer. In some embodiments, the computer network(s) 110 represent or include one or more: Local Area Networks (LAN), Wide Area Networks (WAN), the internet, a telecommunications network, and/or the like. As illustrated in FIG. 1, the network device 116 is included in layer 1 (e.g., a CPE layer), and the network device 112 and network device(s) N 106 are included in one or more layers N (e.g., layer 2, such as an edge layer configured to process data after layer 1 processes the data). The layer(s) N represent any different quantity of layers, such as 3, 4, or 5 layers. In some embodiments, network device 112 and the one or more network devices 106 are included in the same layer, whereas in other embodiments they are located in different layers.

The illustrative operating environment 100 includes the one or more client devices 102. In some embodiments, the one or more client devices 102 represent any suitable device that generates and sends a request for processing data and the processed data or execution functionality (e.g., a notification, message, a processed image data, etc.) of the request is indicated back to the one or more client devices 102.

In some embodiments, the client device(s) 102 represent any suitable computing device associated with a user, such as a smart television, a mobile phone device of a user, a wearable sensor (e.g., a pulse oximeter) worn by a user, and the like. For example, the client device(s) 102 may represent a desktop computer, portable computer, laptop or notebook computer, tablet computer, pocket computer, telephone, smart phone, smart watch, smart glasses, or any other suitable type of electronic device associated with or worn by a user.

In some embodiments, the one or more client devices 102 includes or represents one or more network devices in addition to the network devices 116, 112, and network device N. A "network device" as described herein refers to any suitable computing device configured to process, execute, and/or route a particular request that was originated at a client device. Examples of a network device include a proxy device, such as a router, set-top box, an internet access gateway, a router, a network switch, a residential gateway, an edge device, a cloud node, and the like. A "proxy device" as described herein refers to a gateway (e.g., a router) between a user device (e.g., a television remote of a user, a mobile phone, or the client device 102) and a particular endpoint (e.g., a cloud computing node) network device that is configured to be the last device to process a request. For instance, a proxy device can be an intermediary server that acts as a gateway between end users and the websites (or web servers) they browse. A proxy device that includes machine learning cores or capabilities is referred to herein as an "ML proxy" or "ML proxy device."

Other examples of a network device include a blade server, a web server, an application server, a mainframe, a cloud computing node, a laptop computer, a tablet computer, a netbook computer, a personal computer (PC), a desktop computer, a personal digital assistant (PDA), a smart phone, or any programmable electronic device configured to process and/or route client device requests.

The operating environment 100 illustrates that the one or more client devices 102 send a request 150, which may be a request to process data via one or more machine learning processes. For example, the request 150 may be a request to process image data or video stream sequences (e.g., a request to detect and follow a particular object). In some embodiments, the request 150 is a request to determine any particular anomalies, such as malicious network intrusion or data privacy violations. In another example, the request 150 may be a request to detect specific physical layer ("PHY") issues (e.g., channel condition metrics, such as SNR, MER, etc.).

The network device 116 receives the request 150 and determines, via the routing determiner 104, which network device to route the request 150 to. As illustrated in FIG. 1, the routing determiner 104 uses the routing resource list 120, which includes attributes for each network device in the operating environment 100 (i.e., network device 116, network device 112, and network device(s) 106). In some embodiments the routing resource list 120 (also referred to herein as "resource information") or portions of the routing resource list 120 (e.g., the sub-resource list 120-1) is shared between each of the network devices 116, 112, and 106. Such attributes of the routing resource list 120 include one or more computer resource characteristics of each respective network device (e.g., CPU, memory, data transfer rate) and one or more machine learning processing capabilities of each respective network device (e.g., machine learning model type, hyperparameters used in the model.). In some embodiments, some or each of the network devices 112 and network device(s) 106 additionally include a routing determiner identical to the routing determiner 105 so that they can also make routing determinations for requests using their own version of the routing resource list 120. It is understood that the routing resource list 120 is representative only and may alternatively or additionally include any suitable attributes, as described in more detail below.

"Computer resource characteristics" refers to any particular state of any computing component in terms of hardware, software, and/or signal processing of a respective network device. For example, computer resource characteristics can be any one of neural network types/structures, data transmission rate of a network device, transport protocols of a network device (e.g., User Datagram Protocol (UDP), Transmission Control Protocol (TCP) Reliable Data Protocol (RDP), Apple Talk Transmission Protocol (ATP), etc.), latency incurred by the network device and the corresponding data paths, internal and external memory capacity and bandwidth, processing capacity (e.g., Tera Operations Per Second (TOPS)), security level or types for input/output data. Operation server memory in a cluster, number of servers (or nodes) in a cluster, storage availability within a cluster, actual memory utilization. CPU utilization, network utilization, and the like.

"Machine learning processing capabilities" (also referred to herein as "ML resources" or "ML resource information" or "ML capabilities") refers to any information that indicates specific machine learning functionality that a particular network device is capable of performing or other attributes associated with machine learning. As described herein, various network devices include machine learning cores capable of servicing and processing client requests. These ML capabilities can be shared or distributed across multiple network devices. For example, machine learning capabilities can include supported data paths for ML input and output data flows, supported ML decision statistic or inference types and/or corresponding hyperparameters (e.g., neural network classes (e.g., CNN, LSTM, etc.), prediction goal (e.g., predict image features, predict malware, predict PHP issues, etc.), size of a neural network, neural network topology (e.g., number of layers or neurons, whether fully connected or feed forward, learning rate). Other examples include an indication of whether the model is a clustering model, classification model, regression model, the supported ML input data pre-processing functions (e.g., normalization and scaling) and the ML output data post-processing functions (e.g., return a notification of detected malware, return a detected object with a bounding box), ML model provisioning and storage, and ML engine or ML core execution In some embodiments, based on what the request 150 requires in terms of machine learning (e.g., object detection) and/or based on comparing the attributes (i.e., the machine learning capabilities and/or computer resource characteristics) for the different network devices, the network device 116 routes the request 150 to network device 112 so that the network device 112 can process the request 150 via its machine learning core 114 (or route the request 150 to a more suitable network device to process the request 150). As illustrated in FIG. 1, each network device has its own machine learning core (i.e., 118, 114, and 108). A "machine learning core" as described herein refers to a module that represents or uses one or more machine learning models to make some decision statistic or inference (e.g., a classification prediction using a classification model, a clustering prediction using a clustering model, or regression prediction).

In an illustrative example of the routing of the request 150, the network device 116 may determine that the request 150 requests processing an object in a video stream and that its machine learning core 118 (or machine learning core 108) is incapable of processing the request 150 based on including a different model type and/or hyperparameters needed to process the request. For example, the machine learning core 118 and/or 108 may be configured to process requests to detect PHY device-specific issues, as opposed to image data. However, the routing determiner 140 may determine, via the resource list 120 that network device 112 is capable of processing an object in a video stream (or more specifically, the ML core 114 includes CNN or other machine model functionality that is configured to detect objects, and the like). Additionally, or alternatively actual network device computer resource characteristics, such as CPU utilization, memory capacity/availability can be used. For example, network device 112 may currently have less CPU utilization. In this way, the routing of the request can be based on machine learning or ML core capabilities and/or computer resource characteristics of each network device. Accordingly, the network device 116 may responsively forward the request 150 to the network device 112. Responsively, the network device 112 processes, via the ML core 114, the request (e.g., generate a bounding box over an object in an image and zoom in).

The network device 112 responsively sends the processed data and/or a notification 160 back to the client device(s) 102 so as to execute the request 150. For example, the network device 112 can cause a bounding box to be displayed over a moving person object while the person is moving on a television.

As described herein, ML resources or "ML capabilities" can be defined as the logical high-level resources that are responsible for the support of ML applications across a network. This can include: a) a list of specific IP data networks called ML resource networks; b) the characteristics of each network node in the specified data networks; and c) The (available) ML processing resources (i.e., machine learning capabilities) of the integrated ML core within each network node. In various embodiments, the ML resource networks are rooted at the ML clients where the ML applications reside, and are dynamically formed according to the processing requirements of the ML applications. In some embodiments, for a specific ML resource network, the resource list 120 and/or the request 150 may be distributed and organized across multiple hierarchical (conceptual) network layers (e.g. CPE, Edge and Cloud layers).

In some embodiments, machine learning capabilities includes the supported data paths (for ML input/output), ML inference types (e.g. neural network classes and corresponding hyperparameters), and, for each data network node, data transmission rate. ML processing capacity, security capability, latency, as well as memory footprint and bandwidth. In some embodiments, the machine learning capabilities (e.g., the resource list 120) and/or the request 150 is distributed throughout a hierarchical multi-layered data network infrastructure, and are optimally shared among all ML clients residing within the infrastructure. In some embodiments, the processing of the request 150 is achieved by dynamically routing the ML requests from the ML clients (e.g., the client device(s) 102) to the most suitable network device that includes the most suitable network capabilities (via a respective ML core) that can achieve the requested ML processing under the specific network conditions (e.g., computer resource characteristics and/or machine learning capabilities) at the time of request. In some embodiments, such routing decisions are made hop-by-hop by the ML-resource-hosting servers (or ML servers in short) along the data path from the ML client to the destination ML server, according to these configurable routing policies of the server.

Various embodiments of the present disclosure leverage a concept called ML Proxy as an example of the ML servers. Particular embodiments are directed to efficiently sharing ML capabilities (e.g., the resource list 120) across, for example, a hierarchical multi-layered data network infrastructure. In some embodiments, an ML Proxy is a device with configurable ML cores that performs multi-task ML processing on behalf of IoT devices that have limited ML resources on their own. In some embodiments. ML Proxy functions are implemented in residential broadband gateways (such as Cable Modem, Digital Subscriber Line (DSL) or Passive Optical Network (PON) gateway), broadband-access node (e.g. DOCSIS Remote PHY Device/Remote MACPHY Device. Digital Subscriber Line Access Multiplexer (DSLAM), Optical Line Termination (OLT)), or in any standalone dedicated device in a local area or broadband access network.

Some embodiments utilize any IoT protocols such as MQ Telemetry Transport (MQTT) protocol, Constrained Application Protocol (CoAP). Hypertext Transfer Protocol Version 3 (HTTP/3), etc. As an example, various embodiments may utilize the MQTT protocol, and the CoAP protocol which are commonly deployed on IoT devices. Even though various embodiments of the present disclosure are described using a cable network, it is also applicable to other infrastructures such as those for xDSL and xPON technologies. Furthermore, although various embodiments of the present disclosure targets mass residential ML applications, especially those that can be enabled on residential IoT devices, the functionality can also be applicable in an enterprise environment or other client devices that have similar characteristics.

In some embodiments, there are two schemes for processing the client request 150, sharing machine learning capabilities, and/or sharing computer resource characteristics (e.g., the resource list 120). The first scheme may include a distributed assignment of ML models. For a given ML Application on an IoT device (e.g., the client device(s) 102), a particular ML Proxy (e.g., the network device 112) is dynamically assigned (e.g., at runtime) to support an entire M L processing session for the ML application. For example, a set of ML models can be distributed among the ML Proxies (e.g., network device 116, 112, and 106) across the edge/gateway layers (e.g., layer 1 and layer N), and the ML requests (e.g., that includes the request 150) are routed from various ML applications and are routed to the proxies or network devices that host their corresponding models (e.g., the request 150 only gets processed by the machine learning core 114 of the network device 112 and none of the other network devices). The distribution of the models can be done in such a way that the capabilities of the hosting proxies are compatible with the hosted models.

In some embodiments, the second scheme is referred to as "distributed partition of ML models." In these embodiments, Multiple ML Proxies or network devices across the network operate collectively to accomplish a given inference task or decision statistic, by using the local input data from a set of distributed IoT devices. In these embodiments, multiple machine learning models may be utilized to generate a final inference or decision statistic. For example, a classifier model hosted on a first network device can be a multimodal model (receives heterogeneous inputs, such as image data and natural language characters) that classifies data based on predictions made by other models. This scheme is also called "distributed inference". In these embodiments, the input data are distributed among the IoT devices (e.g., client device(s) 102) while the ML processing (e.g. inference) associated with a given ML model is performed collectively by multiple ML Proxies. For example, the request 150 can processed by both the machine learning core 118 of the network device 116 and the machine learning core 114 of network device 112. This scheme is useful for the ML Applications that require large-scale ML models and distributed input data across the network.

Figure 2:
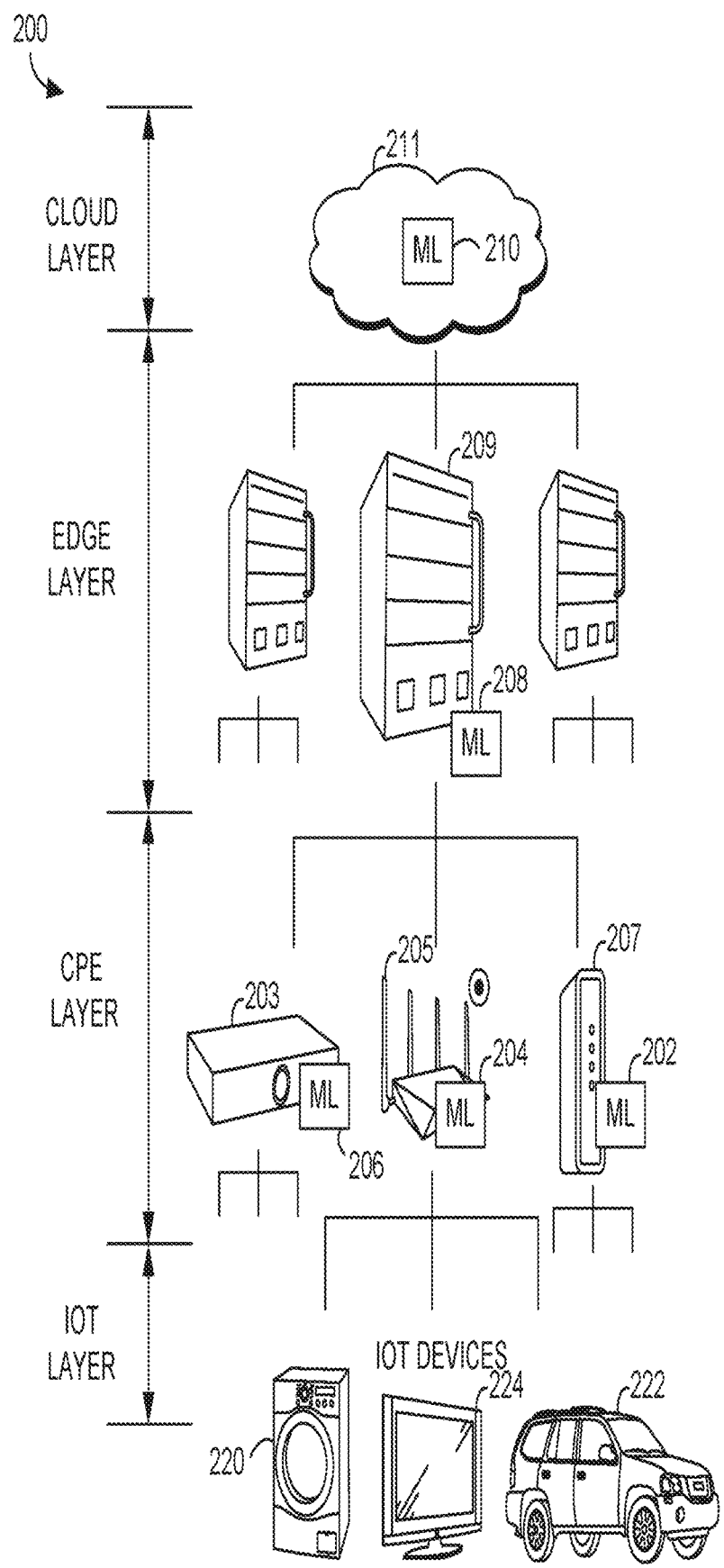

FIG. 2 is a schematic diagram of an example operating environment architecture 200 for which some embodiments of the present disclosure are employed in. In some embodiments, the operating environment 100 represents the operating environment architecture 200 or is included in the operating environment 100. For example, the network devices 203, 205, 207, and/or 210 represent one or more of the network devices of FIG. 1.

As illustrated in FIG. 2, various machine learning cores or processes hare hosted by various proxy devices and distributed across multiple layers in a hierarchical data network infrastructure. FIG. 2 illustrates that the layers include a cloud layer, an edge layer, a CPE layer, and an IoT layer. The IoT layer includes IoT devices, such as the washing machine 220, the car 222, and the sensor 224 (e.g., a wearable sensor that measures oxygen saturation). It is understood that these IoT devices are representative only and that any suitable IoT device can be used, such as a smart home lock system, smart lighting system, a virtual assistant (e.g., a smart speaker), a smart doorbell, and/or the like. An "IoT device" or "IoE device" is any suitable article of manufacture or machine that is programmed for particular applications (e.g., turn on a thermostat, wash clothes, turn on a light), and is equipped with a transmitter to transmit sampled or sensed data to another network device for processing of the sampled or sensed data.

The CPE (i.e., "customer-premises equipment") layer of the environment 200 includes CPE devices 203, 205, and 207, which corresponds to telecommunications hardware typically located in a home, business, or other location of a customer. For example, CPE devices can include cable or satellite television set-top boxes, digital subscriber line (DSL) or other broadband Internet routers, VoIp base stations, telephone handsets, or other customized hardware used by a particular telecommunications service provider.

The edge layer of the environment 200 includes different edge nodes, including edge node 209. An "edge node" is a local processing computing device that is configured to store and process, over a network, either a subset or all of the received or respective sets of data before routing the data to the cloud layer.

In some embodiments, edge layer represents a mesh or other network of microdata centers or edge nodes that process and store local data received from the IoT layer and push or transmit some or all of the data to a cloud device or a corporate data center. In some embodiments, the edge nodes store all of the data and only transmit selected (e.g., data that meets a threshold) or important data to the cloud layer. For instance, non-important data or the data that is in a group that does not meet a threshold is not transmitted. For example, a lidar, radar, and/or camera sensor may sample map data but only push a portion of the map data. Accordingly, only after the condition or threshold has been met, do the edge nodes transmit the data that meets or exceeds the threshold to cloud nodes, such that the cloud nodes can take responsive actions, such as notify a client device indicating the threshold has been met.

The data that does not meet or exceed the threshold is not transmitted to the cloud layer in particular embodiments. In various embodiments where the threshold or condition is not met, daily or other time period reports are periodically generated and transmitted from the edge nodes to the cloud layer indicating all the data readings gathered and processed at the edge nodes. In some embodiments, the edge nodes act as a buffer or gateway between its network and a broader network, such as located in the cloud layer. Accordingly, in these embodiments, the edge nodes can be associated with one or more gateway devices that translate proprietary communication protocols into other protocols, such as internet protocols.

FIG. 2 illustrates that the network devices 203, 205, 207, 209, and 211 each have machine learning cores 206, 204, 202, 208, and 210 respectively. Accordingly, as described herein, a request can be routed to a particular network devices based at least in part on the ML core capabilities. For example, a request originating from the IoT device 220 can be routed to the network device 203, and from the network device 203 to the edge node 209, and from the edge node 209 to the cloud node 211 based on the machine learning capabilities of the network device 203, 209, and/or 211.

FIG. 2 illustrates a hierarchical data network infrastructure. Examples of such network infrastructure includes a broadband access network. In these broadband access networks, the proxy device can be, for example, a residential broadband gateway, a broadband access node, or both in combination. Example broadband access systems include cable, xDSL, xPON, etc.

Figures 3A, 3B, 3C:
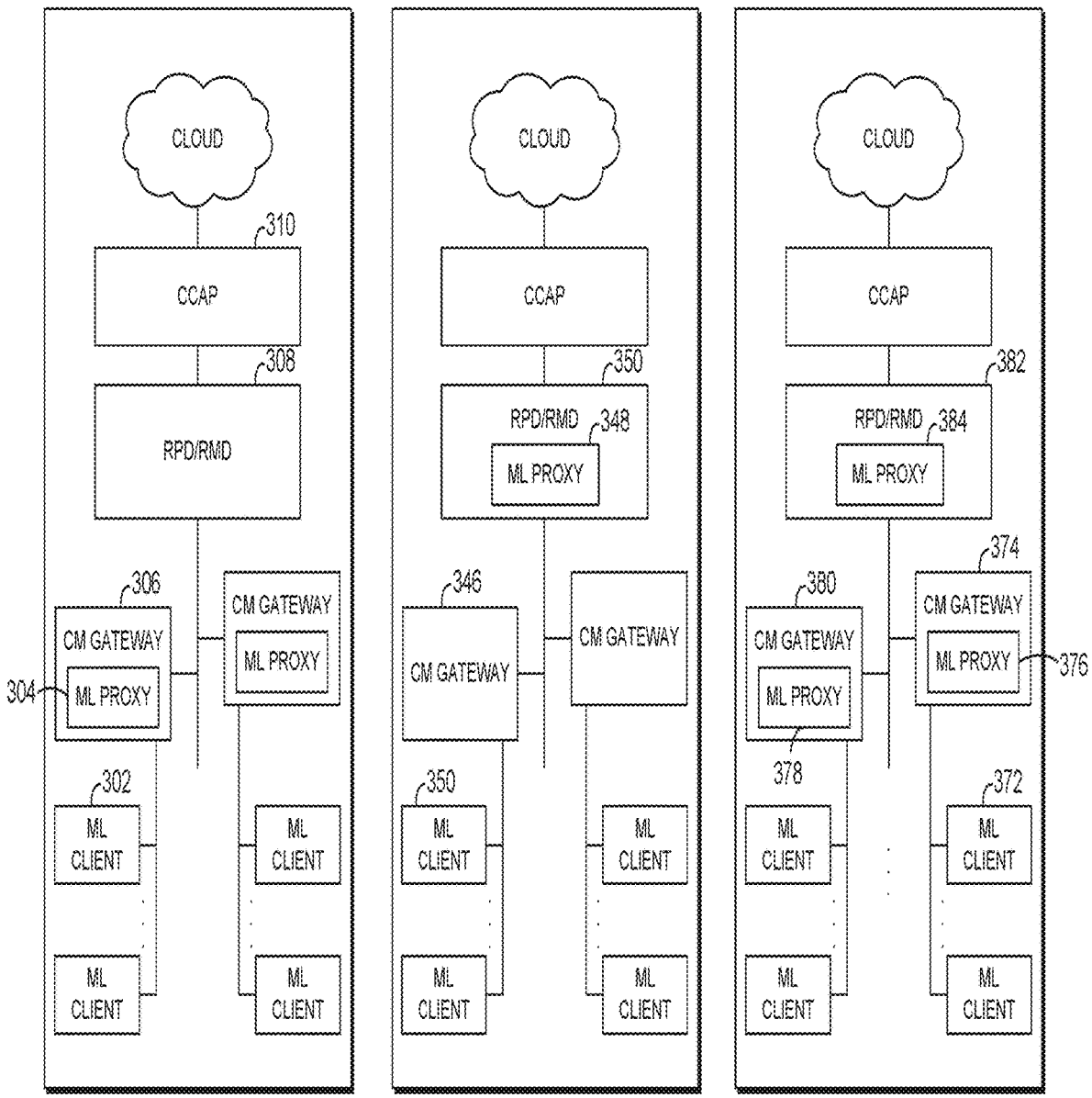
FIG. 3A is a block diagram illustrating that ML proxies are be integrated in (or connected to) a Cable Modem (CM), according to some embodiments.
FIG. 3B is a block diagram illustrating that an ML proxy is integrated or attached to an RPD/RMD device, according to some embodiments.
FIG. 3C FIG. 3C is a block diagram illustrating various ML proxies residing in or connected to CM gateways, as well as RPD/RMDs, according to some embodiments.

FIGS. 3A through 3C illustrate different locations where an ML proxy device (e.g., a network device) may be placed. More specifically, since ML proxy devices include a machine learning core. FIGS. 3A through 3C illustrate where different machine learning cores can reside. In some embodiments, the operating environment 100 includes or represents the components of FIGS. 3A through 3C. For example, the client device(s) 102 can include the ML client 302. In another example, each of the network devices 116, 112, and 106 may be represented by the network devices 306, 308, and 310.

FIG. 3A is a block diagram illustrating that ML proxies are be integrated in (or connected to) a Cable Modem (CM), according to some embodiments. Specifically, for example, the ML proxy 304 is integrated in or connected to the CM gateway device 306 (e.g., the network device 116 of FIG. 1 or at the CPE layer of FIG. 2). Accordingly, the gateway device 306 serves the ML clients (e.g., stored to the one or more client devices 102) attached to the CM gateway device 306 (e.g., via a LAN).

As illustrated in FIG. 3A, the Remote PHY device (RPD)/Remote MACDevice(s) (RMD) 308 and the Converged Cable Access Platform (CCAP) device 310 do not include ML proxy function. The device(s) 308 correspond to an approach to distributed access architecture (DAA). These device(s) 308 move components away from the CMTS headend. PHY moves the physical layer to the network edge, whereas MAC-PHY, for example, moves the Media Access Control (MAC) layer to the edge. The PHY layer or physical layer defines the physical and electrical characteristics of a network. The physical layer is responsible for managing the hardware that modulates and demodulates RF bits. The MAC layer is responsible for sending and receiving RF frames. Typically, as part of each data packet, there is a MAC layer data header that has addressing information as well as packet options. The MAC layer implements packet acknowledgements (ACKs), packet tracking to eliminate duplicates, and the like.

FIG. 3B is a block diagram illustrating that ML proxy 348 is integrated or attached to the RPD/RMD device 350 (as opposed to the CM Gateway 346, as illustrated in FIG. 3A), according to some embodiments. The ML proxy 348 serves the ML clients (e.g., ML client 340) in client devices attached to the CM gateway (e.g., the CM gateway 346). FIG. 3C is a block diagram illustrating various ML proxies 376, 378, and 384 residing in or connected to both the CM gateways 380 and 374, as well as the RPD/RMD 382

As illustrated in FIGS. 3A, 3B, and 3C, the ML processing resources (e.g., ML cores and/or ML proxy devices) are distributed across various network devices. ML proxies may serve each ML client and can be shared by ML clients across the CM gateway boundaries. In some embodiments, the ML proxy device can be integrated with the data network CPE and node devices as well as be implemented as a dedicated standalone device which connects to a CPE or a node device and resides in the LAN or broadband access network. In some embodiments, FIG. 3A. FIG. 3B, and FIG. 3, indicate that a request can be routed to the different M L proxies or network devices based on machine learning capabilities and/or computer resource characteristics of the ML cores within each ML proxy, as described for example, with respect to FIG. 1.

Figure 4:
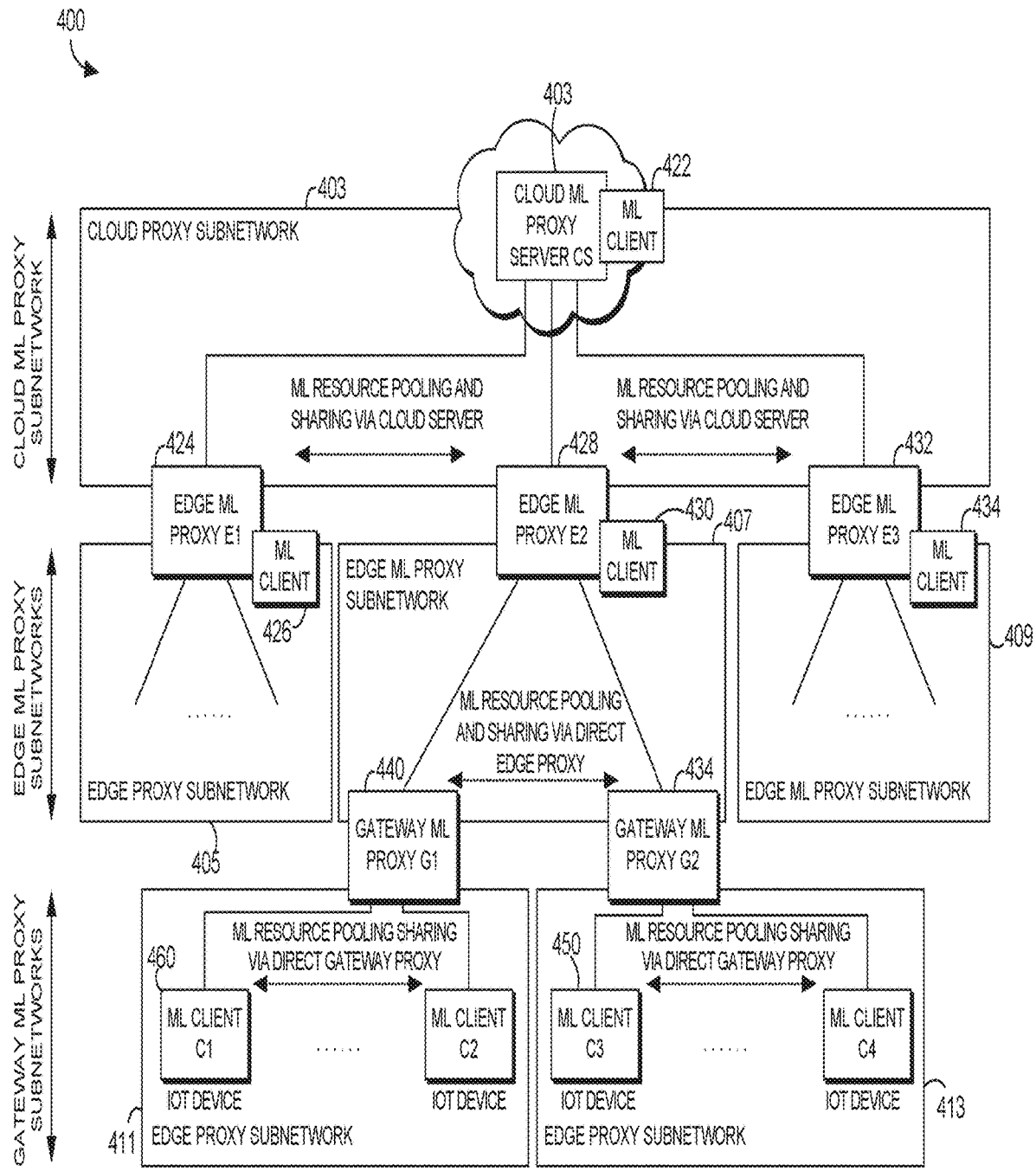

FIG. 4 is a block diagram of an example operating environment 400 for which embodiments of the present disclosure may be employed in. In some embodiments, the operating environment 100 of FIG. 1 includes or represents the operating environment 400 of FIG. 4. In the operating environment 400 of FIG. 4, machine learning resource information (e.g., the resource list 120) is distributed across three subnetworks—the cloud ML proxy subnetwork 403, the Edge ML Proxy Subnetworks (which includes subnetworks 405, 407, and 409), and the Gateway ML Proxy subnetworks (which includes subnetworks 411 and 413).

The cloud proxy subnetwork 403 is a top-level subnetwork that includes a Cloud ML proxy server 420 (e.g., the network device 106) and a set of connected Edge M L proxies 424, 428, and 432 (e.g., the network device 112). The Edge ML proxies 424, 428, and 432 make available to the Cloud ML proxy Server 420 their own ML resource information (e.g., the sub-resource list 120-1) and/or computer resource characteristics. The Cloud ML Proxy Server 420 exposes and shares its available ML resource information (e.g., the sub-resource list 120-2) and/or computer resource characteristics to all Edge ML Proxies 426, 428, and 432 in the Edge ML Proxy Subnetwork. In some embodiments, such ML resource information includes the Cloud ML Proxy Server 420's own as well as those exposed by the Edge ML Proxies 424, 428, and 432 resource information. Accordingly, the following ML resource information is physically available at each Edge ML proxy: (1) Edge Proxy's own resource information (e.g., ML capabilities and computer resource information, such as CPU utilization, network bandwidth, memory availability, etc.), (2) the Cloud ML proxy server 420's own resource information. (3) the resource information made exposed by the Cloud Proxy Server 420 from other Edge proxies, and the like. In some embodiments, the Cloud ML Proxy server 420 is responsible for authenticating the Edge ML proxies (e.g., 424, 428, or 432) that request any of the Cloud ML Proxy server 420's available ML resource information. In this way, each network device within the Cloud ML Proxy Subnetwork 403 can include its own ML client (i.e., clients 422, 426, 430, and 434) in order to request and obtain resource information from each network device such that each network device has a complete list of each other's resource information (e.g., the complete resource list 120). This allows each of the network devices 424, 428, 432, and 420 to be candidates for routing requests (e.g., the request 150) based on the resource information.

Each of the Edge Proxy Subnetworks (405, 407, and 409) includes an Edge ML Proxy Server (i.e., 424, 428, and 432) and a set of connected Gateway ML Proxies 440 and 442. Each Gateway ML Proxies 440 and 442 in the subnetwork makes available to the each respective Edge ML Proxy server 424, 428, and 432 their own resource information. Each Edge ML Proxy server 424, 428, and 432 exposes and shares its available ML resource information to all Gateway ML proxies 440 and 442 in the subnetwork. For example, such resource information can include each Edge ML Proxy's available resources (e.g., memory consumption, CPU, etc.), as well as those pooled from all Gateway ML proxies 440 and 442. Therefore, in some embodiments, the following ML resource information are recursively available at each Gateway ML Proxy in the subnetworks 405, 407, and 409: a Gateway ML proxies own resource information (e.g., sub-resource list 120-3). Gateway ML Proxy's own resource information. Cloud Proxy Server 402's own resource information, those network devices exposed by the edge ML Proxy Server from other Gateway ML proxies in the Edge ML Proxy's subnetwork, and those exposed by the Cloud Proxy Server 402 from other Edge ML Proxy servers. In some embodiments, each Edge ML Proxy Server is responsible for authenticating the Gateway ML Proxy that requests any of its available ML resources.

The Gateway Proxy Subnetworks (411 and 413) include the Gateway ML Proxy Servers 440 and 442 and a set of connected IoT clients (e.g., clients 450 and 460). The Gateway ML Proxy Servers 440 and 442 advertises and shares it resource information to all IoT clients in the subnetwork. In some embodiments, the following resource information is recursively available at the Gateway ML Proxies 440 and 442: The Gateways ML Proxy 440 and 442's own resource information, the Gateway-connected Edge Proxy servers (e.g., 424) own resource information, the Cloud ML Proxy Server 420's own resource information, the resource information exposed by the Edge ML Proxy (e.g., 424) from other Gateway ML Proxies (e.g., 440) in the Edge Proxy's subnetwork, the resource information exposed by the Cloud ML Proxy Server 420 from other Edge ML Proxies (e.g., 428). In this subnetwork and in some embodiments, the Gateway ML Proxy (e.g., 440) is responsible for authenticating the IoT clients (e.g., 460) that request any of its available resource information.

As illustrated in FIG. 4, the ML clients, such as 422, 426, 430, 434, 460, and 450 are not only hosted at the IoT devices (e.g., the client device(s) 102), but also at the Edge ML Proxies 424, 428, and 432, and the cloud ML Proxy Server 420. Each ML client may be responsible for requesting data to be processed (e.g., via machine learning functionality) and/or requesting resource information from another network device for routing.

Figure 5:
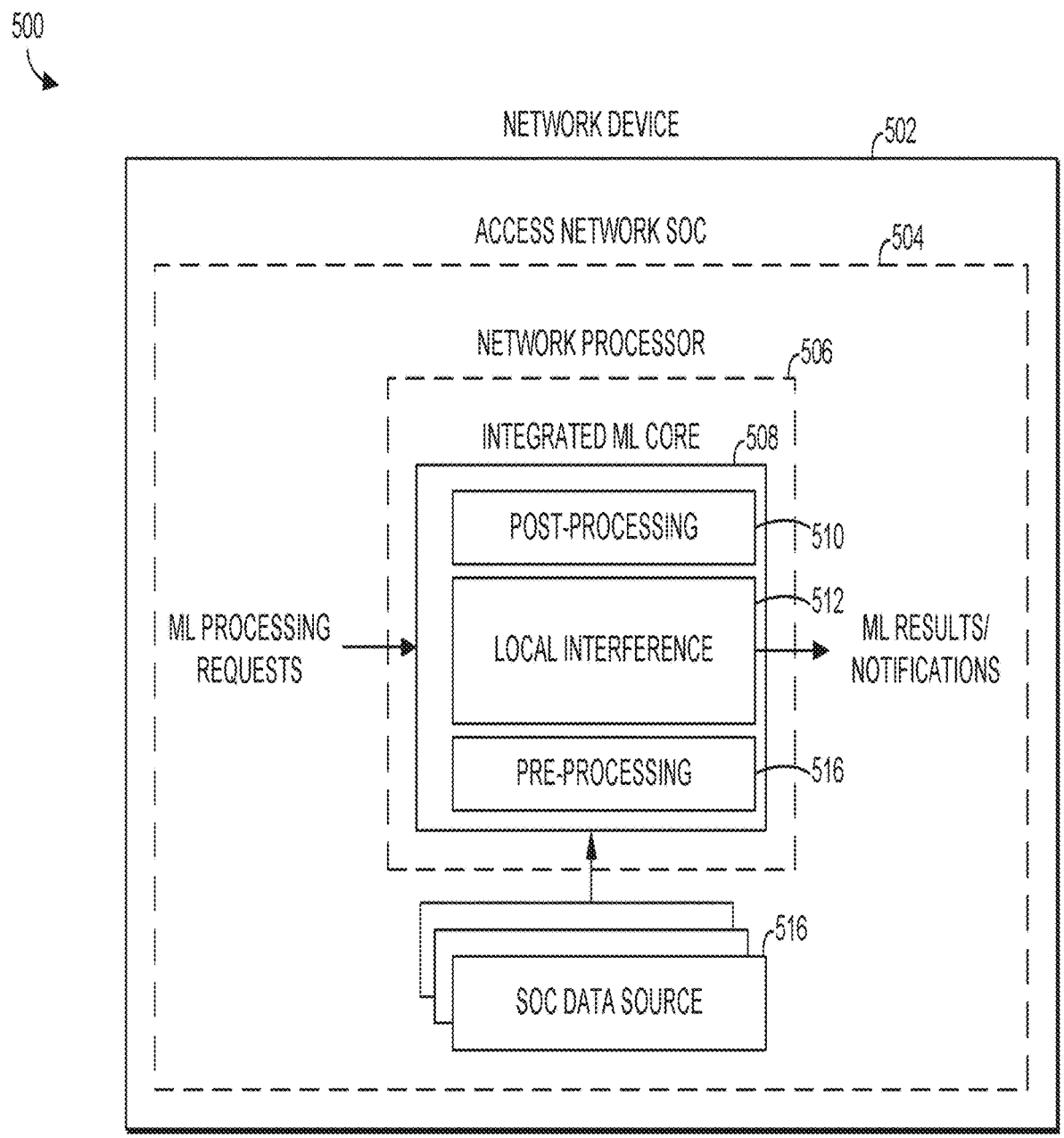
FIG. 5 is a block diagram of an example network device that illustrates how a machine learning core functions, according to some embodiments.

FIG. 5 is a block diagram of an example network device that illustrates how a machine learning core functions, according to some embodiments. In some embodiments, the network device 116, 112, and/or 106 of FIG. 1 (and/or any network device described herein) is represented as the network device 502.

As illustrated in FIG. 5, various embodiments of the present disclosure integrate a machine learning core 508 into a network processor 506 in an access network System on Chip (SoC). ASoC is an integrated circuit that integrates all or most components of a computer (e.g., CPU, memory. I/O ports, secondary storage, etc.) on a single substrate or microchip. Integrating these various components into a single substrate or chip has various advantages, such as lower power consumption and smaller geometry, which may be beneficial when these chips or integrated into smaller or lower power devices, such as set-top boxes, routers, and the like.

The Machine learning core 508 is configured to ML process, within the access network infrastructure, the capabilities or information of which can be shared to other network devices to enable ML clients distributed across the access network to receive data in response to their requests.

The processing modules used by the integrated ML core 508 (e.g., the ML core 114) include a pre-processing module 514, a local inference module 512, and a post-processing module 510. The SoC data sources 516 are fed, as input data, into the pre-processing module 514. Examples of SoC data sources 516 include interfaces, functional modules, and software entities. In some embodiments, the data in the SoC data sources 516 include any data used to train a machine learning model, such as images for object detection, malware signatures to detect malware, and the like.

The pre-processing module 514 is configured to reformatting, normalizing, and/or any other ML feature engineering functions. For example, the pre-processing module 514 may convert raw input data from the SoC data sources 516 into a clean (e.g., useable) data set. In some examples, preprocessing may include or be followed by data wrangling (or data munging). For example, a training component may use data wrangling during the training process of generating a trained model. Data wrangling may be used to transform and/or map the raw training data into a different format that is more appropriate and/or valuable for downstream purposes (e.g., analytics). For example, as the training component is training the model (e.g., after one or more iterations), a different format for the one or more types of the raw training data and/or training data may be determined to be more suitable for downstream purposes than the format that is currently being used. By reformatting this data, performance of a trained model may be more effective. In an example illustration, a natural language word can be changed to a real number (e.g., 0 or 1) to be represented as a feature value in vector space.

The local inference module 512 is generally responsible for generating a decision statistic or inference. For example, if a classification model is being used, the local inference is a classification prediction (e.g., object X is detected as class Y). If a clustering model (e.g., K-means) is being used, the local inference is a clustering prediction. If a regression model is being used, the local inference is a regression prediction. In some embodiments, the inference performed by an ML model are provisioned in the access network SoC 504's nonvolatile memory or dynamically downloaded during runtime.

The post-processing module 510 is generally responsible for reformatting the ML inference output data. For example, post-processing can include data anonymization (e.g., obfuscation, encryption, masking, etc.) of user names or other sensitive data (e.g., social security numbers, addresses, etc.).

In various embodiments, the processing results by the ML core 508 are used to directly trigger the interaction with local user devices (e.g., via a voice utterance on a virtual assistant, video on a television, gesture, graphics, remote control notification, etc.), such as the one or more client devices 102. For example, in response to the post-processing module 510 performing its functionality, the network device 502 may alert a local user device of detected events (e.g., an object or detected malware) and suggest actions that the local user may take (e.g., zoom-in on the object). In some embodiments, the ML Core 508 (or associated network device 502) generates notifications based on the local processing results of the ML core 508 and transmits the notifications to a cloud server (e.g., 211 of FIG. 2) for further analysis. In some embodiments, such analysis can be for a specific access network device. In some embodiments, the notifications from multipole access network devices can also be used for joint analysis (e.g., for correlation analysis). Correlation analysis can analyze the strength of relationship between two or more numerically measured and continuous variables, such as height and weight.

The ML core 508 can be used in a variety of ML applications. For example, applications can be developed using integrated ML cores to help the network operator diagnose the network related issues in order to improve operational efficiency and/or detect an audio/service anomaly in order to improve customer satisfaction. In another example, the ML resource information available within the access network infrastructure can be used to support various ML application running on the CPE devices within residential homes or enterprises, as described herein. FIGS. 6 through 10 below illustrates various applications or machine learning functionality that a machine learning core can perform, according to various embodiments.

Figure 6:
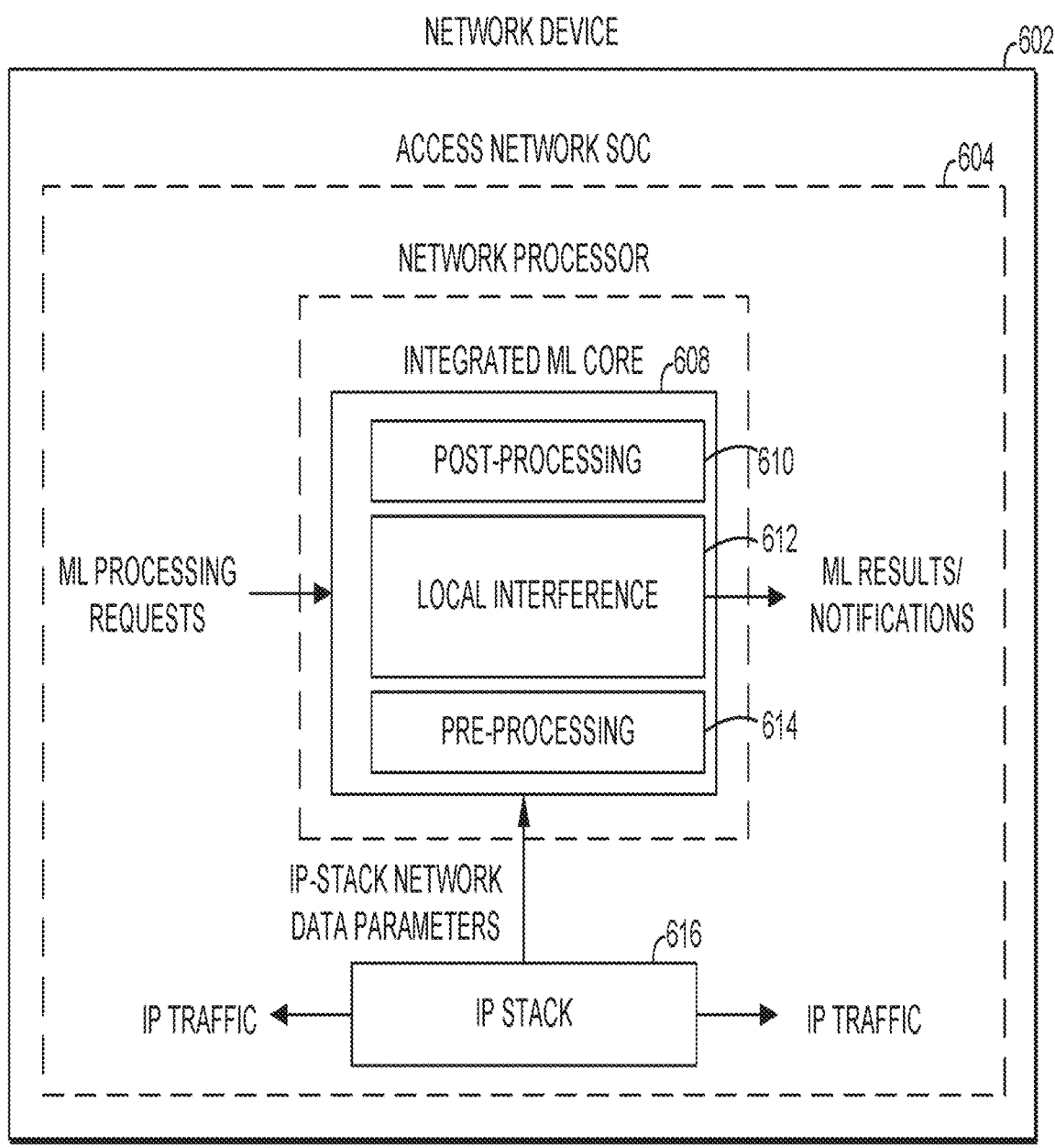
FIG. 6 is a block diagram of an example network device that illustrates how a machine learning core functions to detect anomalies, according to some embodiments.

FIG. 6 is a block diagram of an example network device that illustrates how a machine learning core functions to detect anomalies, according to some embodiments. In some embodiments, the network device 502 of FIG. 5 includes the components and functionality described with respect to FIG. 6.

As illustrated in FIG. 6, the ML core 608 processes the IP-stack network data 616 in order to diagnose, via the ML processing requests (e.g., the request 150), one or more anomalies and/or activities of the access network. In these embodiments, the ML core 608 and the IP stack 615 (network data parameters) are co-located in the same access network SoC 604. Specifically, the IP-network Data parameters within the IP stack 616 are passed to the pre-processing module 614, then to the local inference module 614, then to the post-processing module 610 to generate a notification or send data.

An "anomaly" can be a deviation within the data (e.g., the IP stack 616) outside of some threshold. Examples include connectivity, media content leak, malicious network intrusion, and the like being outside of some threshold. Examples of the local inference made by the local inference module 612 can be the following. A diagnosis of a connectivity issue for constituent subnetworks (e.g., IoT network, home network, edge network, etc.). Connectivity issues, for example, can include an unexpected network failure at a network device (e.g., because of a failure at one of the SYN. ACK, SYN-ACK steps for handshaking), duplicate IP addresses, IP address exhaustion, DNS problems, single workstation unable to connect, etc. Other examples of a local inference made by the local inference module 612 can be a detection of media content leak (e.g., media is being broadcast to an unauthorized devices), data privacy violations (e.g., names, social security numbers, or other privacy information being leaked), detection of malicious network intrusion (e.g., detection of malware, such as an injection attack), identification of source and destination websites for the audio/video media content that is transported across the access network.

Figure 7:
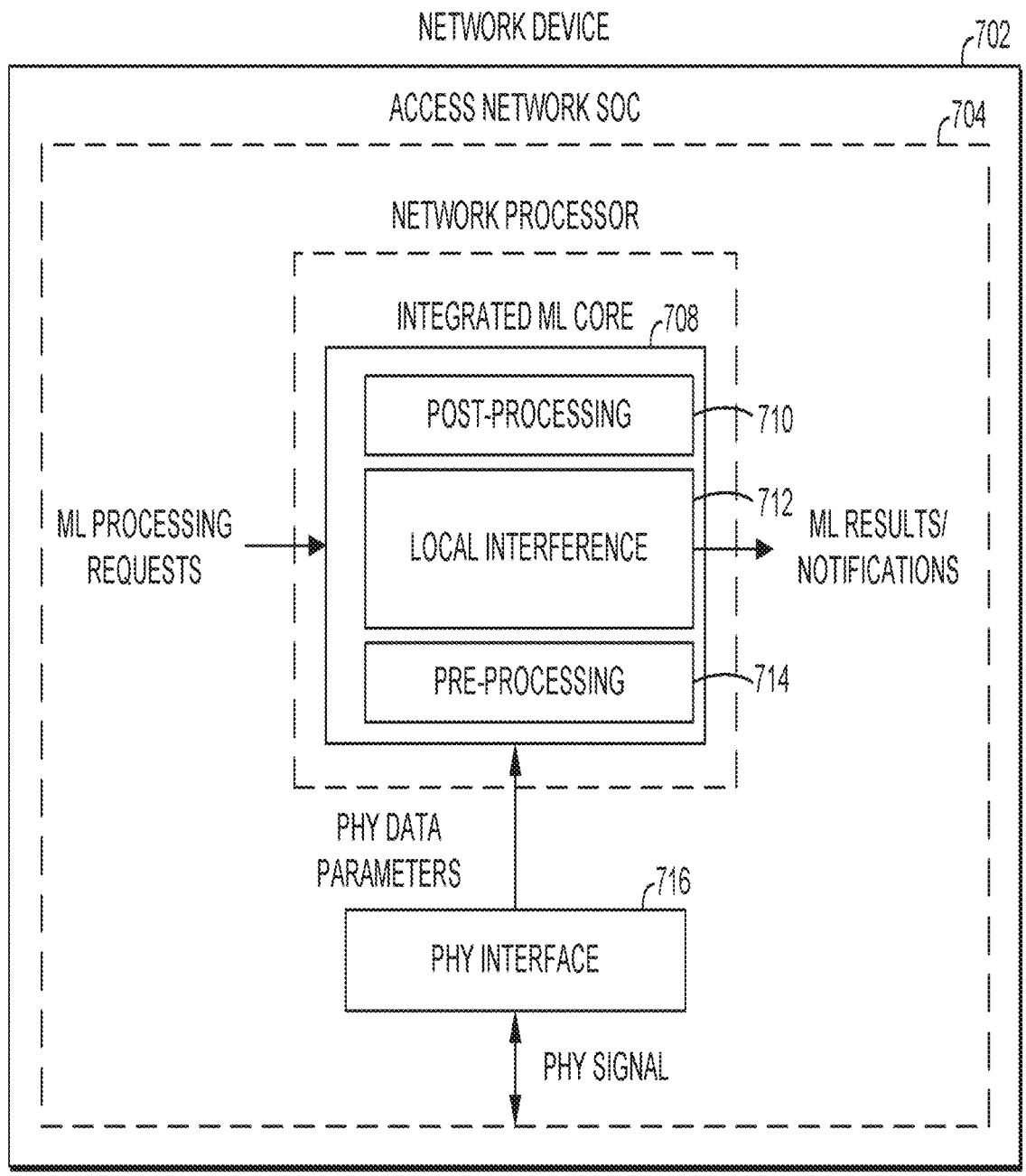
FIG. 7 is a block diagram of an example network device that illustrates how a machine learning core functions to detect device-specific and/or network-wide PHY issues, according to some embodiments.

FIG. 7 is a block diagram of an example network device that illustrates how a machine learning core functions to detect device-specific and/or network-wide PHY issues, according to some embodiments. In some embodiments, the network device 502 of FIG. 5 includes the components and functionality described with respect to FIG. 7. PHY data parameters at the PHY interface 716 are passed to the ML core 708, and the ML core 908 processes the ML processing request (via the pre-processing module 714, the local inference module 712, and the post-processing module 712).

PHY is a short form for Physical Layer or medium. It is typically the layer-1 in the OSI stack. It interfaces the physical medium with MAC and upper layers. Physical medium can be copper wire, fiber optic cable, twisted pair, and/or wireless channel. More specifically. PHY is a circuitry unit that connects a link layer device (e.g., a MAC) to a physical medium, as described above. A PHY device typically includes a Physical Coding Sublayer (PCS) and a Physical Medium Dependent (PMD) layer. The PCS encodes and decodes data that is transmitted and received. Accordingly, local inferences or decision statics from machine learning models can be made for the PHY or physical medium based on various physical medium. PHY, and/or MAC characteristics.

Examples of the local inference made by the local inference module 712 can be the following, detection and classification (e.g., via a classification-based machine learning model) of network impairments, such as classifications of: signal constellation (e.g., based on symbols), RF spectrum (e.g., classification of particular RF value), channel noise (e.g., a classification of a particular noise value or category, such as a particular frequency range level), a classification channel condition metric (e.g., SNR, MER, etc.). Other examples include estimation and recommendation of network operational parameters (e.g., SNR margin, OFDM bit-loading profile). Other examples include characterization of sub-network conditions (e.g., WiFi RF environment, home cable wiring conditions, etc.). In some embodiments, network impairment predictions include prediction of the time or existence of: delay, jitter, packet loss, and the like. Examples of device-specific issues include a prediction that a physical medium (e.g., cable) is damaged based on "shooting stars" or sparkling in a video, a fuzzy or blurry picture (e.g., the display resolution is outside of a threshold), no pictures or intermittent pictures (e.g. outside of a threshold) in a video, no sound or intermittent sound (e.g., outside of a threshold), colors outside of an ordinary color threshold, and the like.

Figure 8:
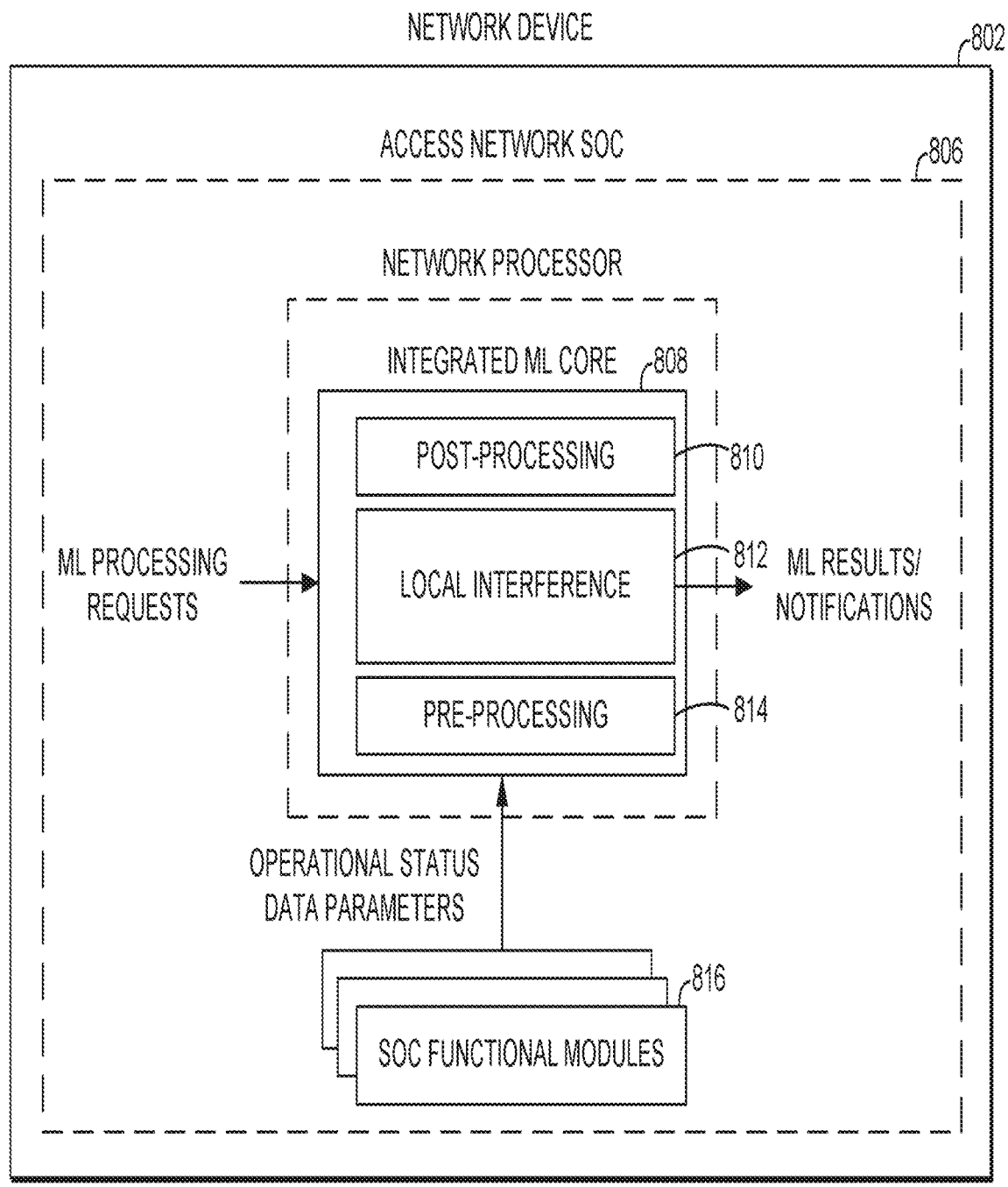
FIG. 8 is a block diagram of an example network device that illustrates how a machine learning core functions to detect particular operational anomalies, according to some embodiments.

FIG. 8 is a block diagram of an example network device that illustrates how a machine learning core functions to detect particular operational anomalies, according to some embodiments. In some embodiments, the network device 502 of FIG. 5 includes the components and functionality described with respect to FIG. 8. Specifically, the operational status data parameters of the SoC functional modules 816 are passed to the pre-processing module 814, then to the local inference module 812, then to the post-processing module 210 to generate a notification or send data As illustrated in FIG. 8, the ML core 808 processes the SOC functional modules 816 in order to diagnose or detect, via the ML processing requests (e.g., the request 150), one or more anomalies at the SoC. Specifically, the operational status data parameters of the SoC functional modules 816 are passed to the pre-processing module 814, then to the local inference module 814, then to the post-processing module 810 to generate a notification or send data based on the ML processing request. In this way, anomalies on chip (the access network SoC 806) (e.g., on a user device) can be detected.

Various devices have access to or store significant sensitive, personal data including our bank and credit card information, email contacts, browsing history, location, even intimate physiological information such as heart-rates and sleep patterns. In addition to personalized end-user information, these devices contain highly confidential collateral from architecture, design, and manufacturing, such as cryptographic and digital rights management (DRM) keys, programmable fuses, on-chip debug instrumentation, defeature bits, etc. Malicious or unauthorized access to secure assets in a computing device can result in identity thefts, leakage of company trade secrets, and the like. Accordingly, embodiments described herein can predict a particular anomaly will occur on chip (i.e., on the access network SoC 806).

Examples include detection and prediction of a particular security violation, such as predicting a particular malware signature (e.g., based on historical malware signatures) that is stored to a device. In some embodiments, recommendation of SoC thermal throttling actions after a prediction can be made. Typically, thermal throttling includes capping the maximum frequency at which a SoC may operate. Throttling helps ensure that the SoC does not reach high temperatures. When temperatures rise over a threshold, the system can throttle performance, which reduces heat. With some malware (e.g., viruses), for example, the malicious result is causing high temperatures to computers. However, as described herein, some embodiments can predict a particular malware is stored to a device based on learned malware signature features and responsively throttle the system.

Some embodiments additionally perform traffic load balancing or routing based on predicting a particular anomaly at the SoC level. In this way, requests can be routed to different network device than the anomaly detected at the access network SoC 806 so that malicious data will not be injected into the requests and/or to reduce heat or otherwise share request loads via load balancing.

Figure 9:
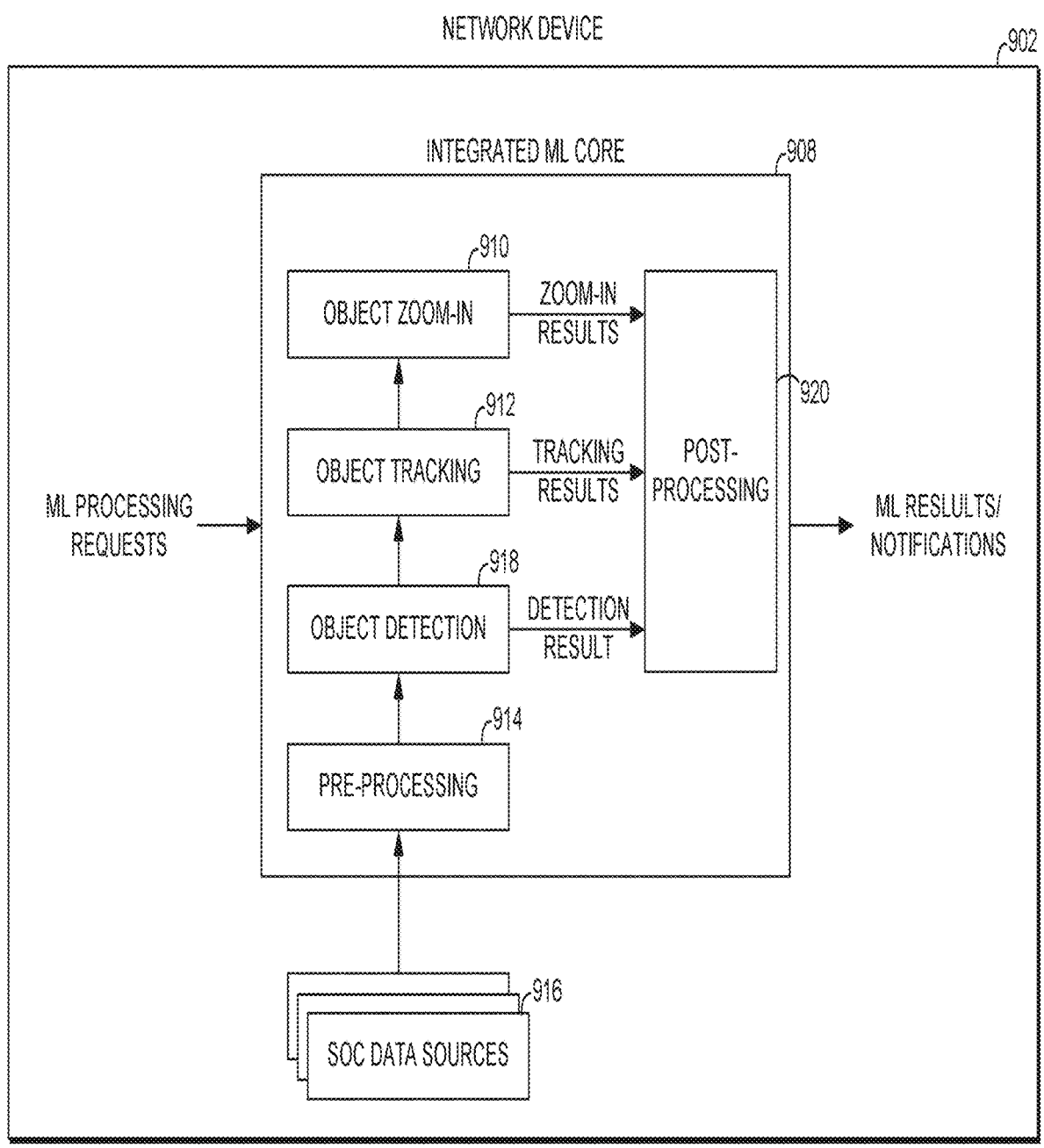
FIG. 9 is a block diagram of an example network device that illustrates how a machine learning core functions to detect and track particular objects, according to some embodiments.

FIG. 9 is a block diagram of an example network device that illustrates how a machine learning core functions to detect and track particular objects, according to some embodiments. In some embodiments, the network device 502 of FIG. 5 includes the components and functionality described with respect to FIG. 9. FIG. 9 illustrates that the ML core 908 is applied to enable end-to-end ML applications with a pipeline of three (or more) distinct stages of inference operations-via the object detection module 918, the object tracking module 912, and the object zoom-in module 910. An "object" as described herein refers to a logical concept that represents any logical entity with a unique signature (e.g., feature set) embed in the ML input data. For example, an object can refer to a unique set of pixels that represent a car, building or other object in image data.

Object detection is the process of detecting and classifying particular objects. Particular embodiments use one or more machine learning models (e.g., a Convolutional Neural Network (CNN)) to generate a bounding box that defines the boundaries and encompasses a computer object representing the particular locations or features of the location (e.g., buildings, landscape, shrubbery, etc.). A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects. In some embodiments, one or more machine learning models can be used and trained to generate tighter bounding boxes for each object. In this way, bounding boxes can change in shape and confidence levels for classification/prediction can be increased based on increased training sessions. For example, the output of a Convolutional Neural Network (CNN) or any other machine learning model described herein can be one or more bounding boxes over each location feature where each bounding box includes the classification prediction (e.g., this object is a building) and the confidence level (e.g., 90% probability).

Accordingly, the object detection module 918 detects and classifies the objects present in the ML input data (e.g., the SoC data sources 916 and the runtime ML processing request) by detecting signature(s) associated with the objet(s). In various embodiments, the detection and classification includes the determination of an object's presence as well as any attributes associated with the objet (e.g., its geometric location and shape within an input image, the signal quality indicators within a PHY-layer input data, etc.).

The object tracking module 912 is generally responsible for tracking an object in response to object detection via the object detection module 918. In various embodiments, the object tracking module tracks the object continuously or periodically across the input data samples. In this way, a bounding box, for example can continuously be placed over an object over various windows or time sequences. In some embodiments, object tracking includes determining the object's updated attributes (e.g., the object's new locations and shapes in the input image stream, the updated signal indicators of the input PHY data, samples, etc.).

The object zoom-in module 910 is generally responsible for zooming in on the detected object by scaling the associated attributes (e.g., by enlarging the tracked images or pixels of the images) and/or by detecting more detailed attributes (e.g., additional PHY-layer signal quality indicators and metrics or additional sub-image objects of a larger object).

In some embodiments, the post processing module 910 incorporates the results from the modules' 918 and 912 and produces the final ML output results and/or notifications, applying any necessary data-privacy rules. For example, the network device 902 may cause image data to be streamed to a client device with a bounding box over an object in the image data while the object is moving and with the object zoomed-in relative to the other image data outside of the object. For example, a user may desire to obtain a close-up of a particular runner in order to see the runner's biomechanical motions. Accordingly, a client device may receive a request to zoom-in on the particular runner as described and accordingly forward the request to a network device that has the particular machine learning capabilities and/or computer resources available to process the request, as described, for example, with respect to FIG. 1.

Figure 10:
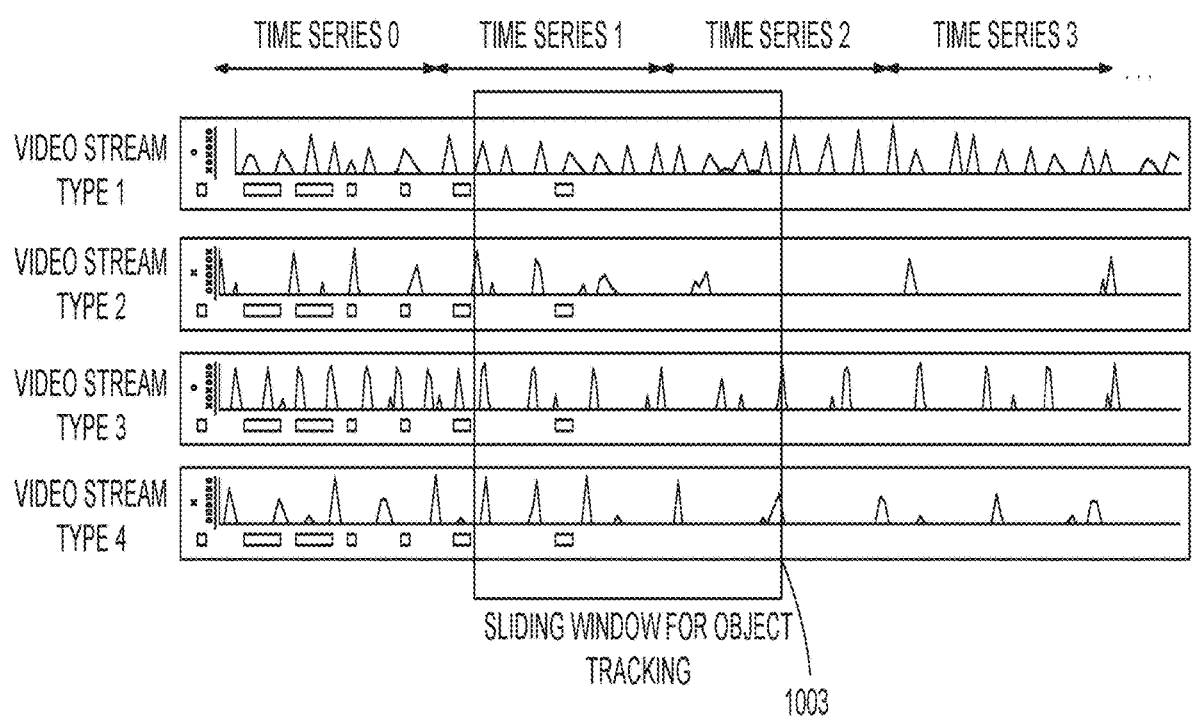
FIG. 10 is a time-series diagram illustrating that a video stream type can be detected and that a sliding window is used to determine an object's continuous presence within a video stream, according to some embodiments.

FIG. 10 is a time-series diagram illustrating that a video stream type can be detected and that a sliding window is used to determine an object's continuous presence within a video stream, according to some embodiments. In some embodiments. FIG. 10 illustrates an example of end-to-end ML processing by a ML core (e.g., the ML core 908 of FIG. 9) to classify or otherwise predict a video stream type (e.g., movie, sports, news) by using time-series packet counts (e.g., quantity of received/transmitted TCP/UDP packets across a gateway device, such as a cable modem) as the ML input data, as illustrated in FIG. 10. A "time-series" refers to a series of data at any time duration or interval, such as X second time increments.

FIG. 10 illustrates that time-series packet counts are sampled for a gives set of video-stream types, and are used to train a ML model, which classifies or predicts any sampled video stream into one of the video-stream types (i.e., video stream type 1 (e.g., sports), video stream type 2 (e.g., movies), video stream type 3 (e.g., cartoons), and video stream type 4 (e.g., news)) in the training data set. In some embodiments, if the classification or prediction probability for a video-stream type exceeds a certain threshold (e.g., 60%), the objet that represents the video-stream type is considered to be "detected." In some embodiments, in response to the video-stream type being detected, it is tracked by running the ML model over the time-sires input data within a sliding window 1003, as illustrated in FIG. 10. In some embodiments, the sliding window 1003 has the same duration as that of a time-series input data. For example, time series 0 may have a duration of 5 minutes. Likewise, the sliding window 1003 may also have a duration of 5 minutes. The sliding window 1003 thus allows tracking of an object within a video-stream at a particular time-series to determine the object's continuous presences in the video-stream. In some embodiments, the tracked object can be zoomed-in (e.g., via the object zoom-in component 910 of FIG. 9) by triggering additional ML or stochastic processing in order to produce more detailed information about the tracked object. For example, in a hurdling sporting event, a particular runner can be detected, with a bounding box over the runner. Certain embodiments can enlarge the pixels inside the bounding box or "zoom in" on the runner while the runner is running a hurdles event across a time-series.

In some embodiments, additional ML or stochastic processing includes indicating or classifying the sub-types of a particular sampled video-stream. For example, a type of movie can have a sub-type, such as "cartoon." "old western" movie. "action" movie. "comedy." "romantic." "drama," and the like. Similarly, types of sporting events can have sub-types, such as "American football." "soccer," "tennis," "hockey," "basketball," "baseball" and the like. In some embodiments, this end-to-end ML processing is enabled by the integrated ML core's directed access to the required data within the SoC.

Figure 11:
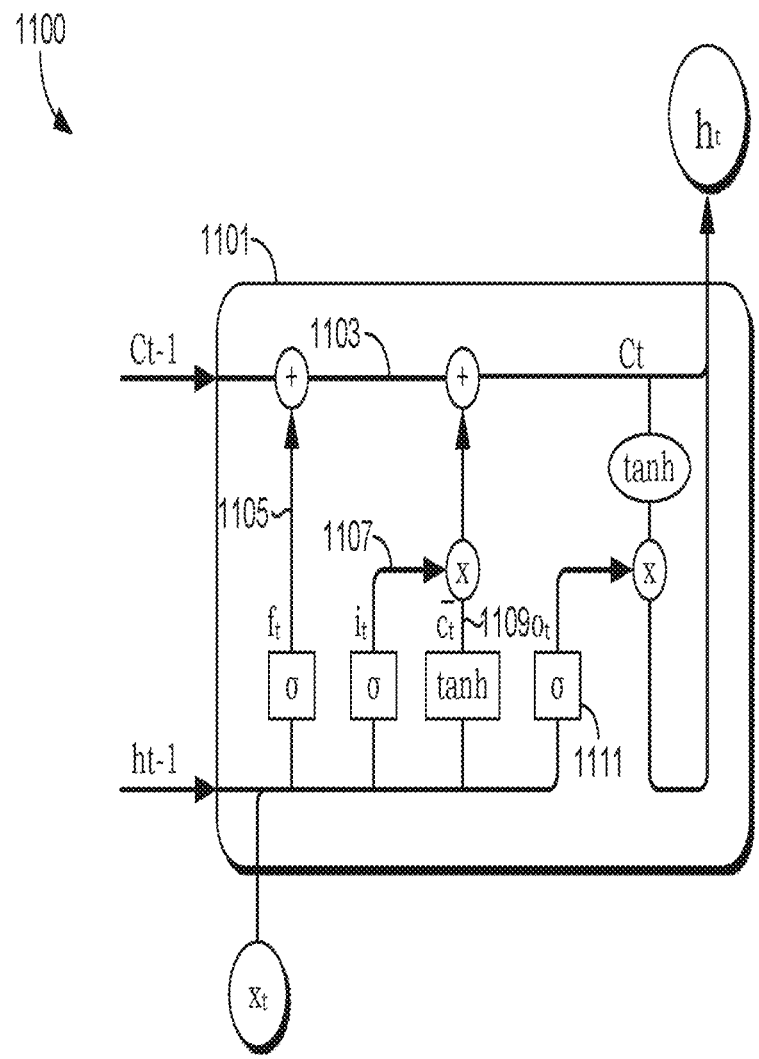
FIG. 11 is a schematic diagram illustrating how time-series data (e.g., video streams) are processed using a Long Short Term Memory (LSTM) model, according to some embodiments.

FIG. 11 is a schematic diagram illustrating how time-series data (e.g., video streams) are processed using a Long Short Term Memory (LSTM) model 1100, according to some embodiments. In some embodiments, the LSTM 1100 represents functionality performed via the machine learning cores 908 of FIG. 9 and/or with respect to FIG. 10. Although FIG. 11 illustrates a LSTM, it is understood that this is illustrative only and that any quantity or type of suitable components can exist. For example, in some embodiments, other models (e.g., a CNN or Hidden Markov Model (HMM)) can be alternatively used instead of an LSTM.

FIG. 11 illustrates how feature vectors (e.g., representing video streams) can be aggregated and concatenated sequentially. The LSTM model function assumes that a downstream event (or later-in-time event, such as a last cell feature of a row) depends upon, and is a function of, one or more events that came before (e.g., a previous image of the same video stream). In other words. LSTM is a model that shares weights over time. In a table encoding context, the model can learn cell feature patterns over time based on past cell feature observations (e.g., determine that the first three time series indicate specific objects, so the next cell of the same row is likely to be a specific object as well).

Element or cell 1101 represents a feature vector representing time series values of a particular data set, or other element. In an illustrative example, the cell 1101 may represent a particular time series of a particular video stream, as described with respect to FIG. 10. The cell state 1103 corresponds to selective memory of past cell states (i.e., it takes data (e.g., vector values) that has been forgotten or disregarded and data that has been remembered or preserved) and passes on remembered data to the next cell or step (e.g., a next portion of a video stream in a next time series). When data arrives at the last cell (e.g., representing the last portion of a video stream in a last time series), $C_t$ is linearly combined with $h_{t+1}$ such that $h_{t+1}$ is the final output.

In various embodiments, the first operation occurs when the forget gate layer 1105 (a sigmoid layer) determines what vector values gets removed from the cell state 1103, as represented by $f_t=\sigma(W_f\cdot[h_{t-1}, x_t]+b_f)$. It takes $h_{t-1}$ (e.g., the previous cell state corresponding to previous feature values in a previous time series and video stream portion) and $x_t$ (current vector values) and outputs a number between 0 and 1. A value close to or within a threshold of value of 1 indicates true or keep this data while a 0 or value within a threshold value of 0 indicates forget or get rid of the data. A previous cell state indicates at least a portion the vector values that were passed from the previous cell, as opposed to the overall cell state that indicates at least a portion the data that was passed for at least a portion of cells up until a particular point.

In various embodiments, the next operation is to determine what information will be stored or moved along the cell state 1103, as represented by $i_t=\sigma(W_i\cdot[h_{t-1}, x_t]+b_i)$; $\tilde{C}_t=\tan h\ (W_C\cdot[h_{t-1}, x_t]+b_C)$. This occurs via the input gate layer 1107 (another sigmoid layer) and the tan h layer 1109. The gate layer 1107 determines which vector values will be updated and the tan h layer 1109 generates a single vector of new candidates $C_t$. In an example illustration, embodiments can forget table entry feature values or vector representations that are: duplicative, noisy, are below and/or above some threshold, such as surpassing a number of predefined words or other character sequence, and/or contain extraneous information not analyzed or encoded, such as certain symbols and the like.

Certain embodiments then update the old cell state 1103 ($C_{t-1}$) into the new cell state $C_t$, as represented by $C_t=f_t*C_{t-}$ 1+$i_t$*$\tilde{C}_t$. Accordingly, the old cell state ($C_{t-1}$) is multiplied by 1105, forgetting the vectored values described above. Then, the input gate layer 1107*the tan h layer 1109 is added. In the last step, it is determined what is outputted, which is represented by $o_t$=σ($W_o$ [$h_{t-1}$, $x_t$]+$b_o$); $h_t$=$o_t$*tan h ($C_t$). The output is based on the new cell state $C_t$, which is a filtered version of the cell state. A sigmoid layer determines what parts of the cell state 1103 ($C_t$_1) will be output. The cell state 1103 is run through tan h so that the values are between −1 and 1, represented by the final output $h_{t+1}$. And this is multiplied by the sigmoid gate 1111 so only the necessary values are outputted. In various embodiments, the final output $h_{t+1}$ includes a concatenated feature vector or contextualized vector that aggregates some or each of the video stream feature values of one or more time series, as described herein. For example, the output can be a concatenated feature vector that represents each time series of a particular video stream, with particular forgotten values.

Alternative (or in addition) to using an LSTM as illustrated in FIG. 11, some embodiments utilize other models, such as a Hidden Markov Model (HMM), and/or a Gaussian Mixture Model (GMM) to process time-based data, such as video streams.

Figure 12:
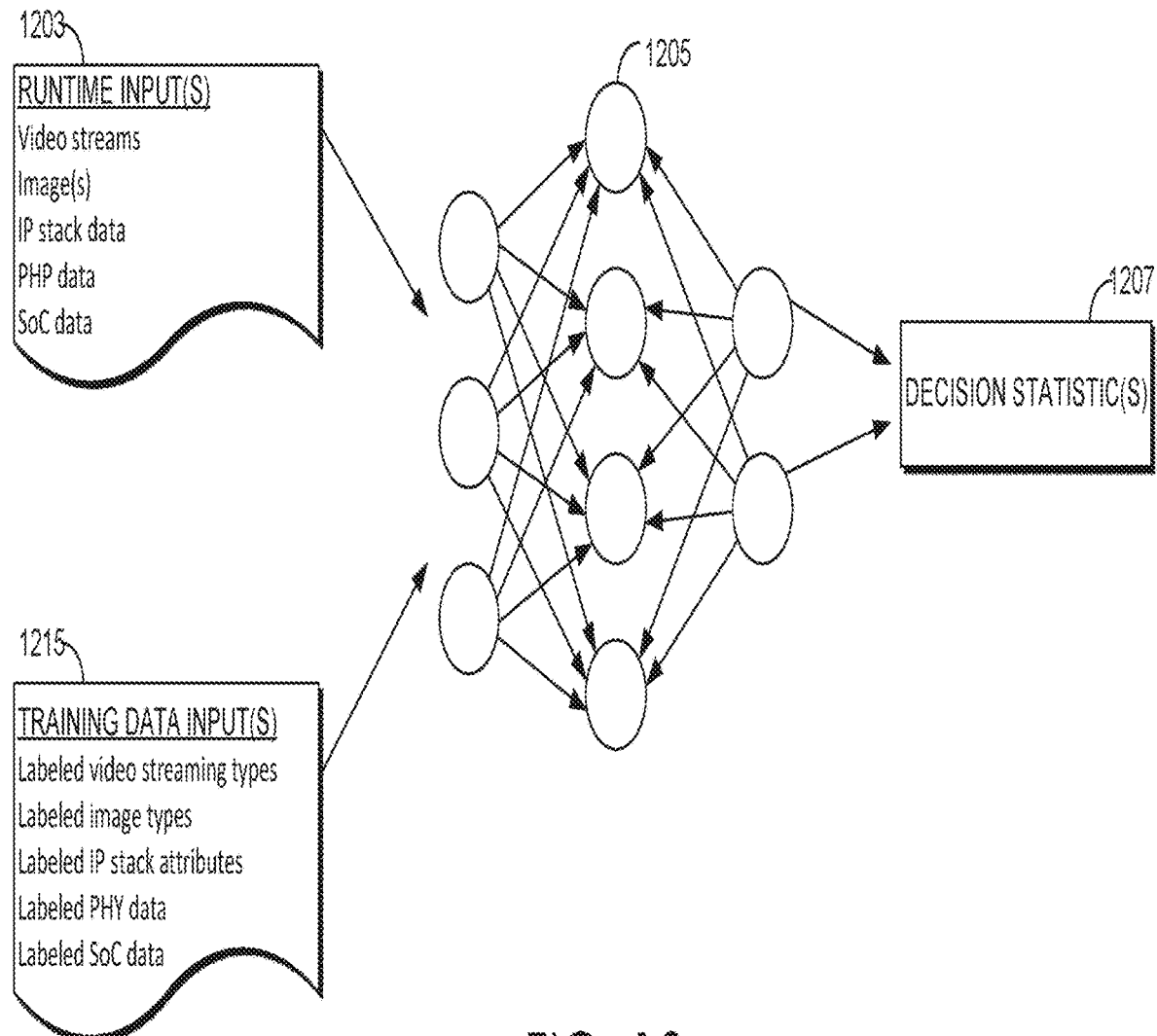
FIG. 12 is a schematic diagram illustrating how a decision statistic is generated using one or more machine learning models, according to some embodiments.

FIG. 12 is a schematic diagram illustrating how a decision statistic is generated using one or more machine learning models, according to some embodiments. In some embodiments, FIG. 12 represents the data and functionality used by any machine learning core described herein, such as the machine learning core 508 of FIG. 5. FIG. 12 illustrates that one or more of the runtime input(s) 1203 are fed or processed through the machine learning model(s) 1205 to generate a decision statistic based on the machine learning model(s) 1205 having previously trained on the training input(s) 1215. Although the runtime input(s) 1203 indicate specific inputs, they are representative only and more or fewer inputs may be used.

The one or more machine learning models 1205 generates one or more particular decision statistic predictions 1207 (e.g., a classification prediction of a classifier model, a clustering prediction of a clustering model, or a regression prediction for a regression model) given the runtime input(s) 1203. Such machine learning model(s) 1205 may be any suitable model of any suitable type. For example, such machine learning model(s) can be supervised or unsupervised and can be or include a neural network (e.g., a Convolutional Neural Network (CNN) or Siamese Neural Network), decision trees, random forests, support vector machine. Naïve Bayes, and or clustering (e.g., K-means clustering). Accordingly, although the machine learning model(s) 1205 is represented as a neural network, it is understood that any suitable machine learning model (or combination of models) can alternatively or additionally be used. In an illustrative example of the decision statistic(s) 1207, the machine learning model(s) 505 may cluster or classify a feature vector representing a video stream of the input(s) 1203 in a cluster or group representing a particular video stream type (e.g., a "sports" stream).

In certain embodiments, the decision statistic(s) 1207 may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem.

In some embodiments, the machine learning model(s) 1205 converts or encodes the runtime input(s) 1203 and/or training data input(s) 1215 into corresponding feature vectors in feature space. A "feature vector" (also referred to as a "vector") as described herein includes one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features. For example, embodiments can parse, tokenize, and encode each natural language word within the runtime input(s) 503 into a single feature vector.

In various embodiments, the machine learning model(s) 1205 learn, via training, parameters or weights so that similar features are closer (e.g., via Euclidian or Cosine distance) to each other in feature space. In some embodiments, this training is done in supervised manner using a loss function (e.g. Triplet loss or GE2E loss) that try to map similar features into one classification or cluster. Training can occur on any suitable training data input(s) 1215, such as labeled video streaming types (e.g., as indicated in FIG. 10), labeled image types (e.g., as indicated in FIG. 9), labeled IP stack attributes (e.g., as indicated in FIG. 6), labeled PHY data (e.g., as indicated in FIG. 7), and/or labeled SoC data (e.g., as indicated in FIG. 8). Some or each of these inputs indicate whether corresponding data are indicative of a particular class or cluster based on features (e.g., image features, malware signatures, etc.) of the inputs.

Various embodiments can represent one or more feature vectors representing the input(s) 1215 in vector space by aggregating (e.g. mean/median or dot product) the feature vector values to arrive at a particular point in feature space. For example, in supervised learning contexts, a training component can receive a particular malware signature and a specific label, such as "Rootkit X version" and the like that indicates that the features of the training data input is indicative of the particular Rootkit Malware.

Embodiments, can then run the training inputs 1203 with the corresponding labels through the machine learning model(s) 1205 so that different feature values and weights are learned according to the label. In this way, when training inputs 1215 are received, corresponding weights or features can be learned. In some embodiments, the training component of the machine learning model(s) 1205 learns features from the training data input(s) 1215 and responsively weights them during training. A "weight" in the context of machine learning represents the importance or significant of a feature or feature value for prediction. For example, each feature may be associated with an integer or other real number where the higher the real number, the more significant the feature is for its prediction. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores.

In another illustrative example of the training component, some embodiments learn an embedding of feature vectors based on learning (e.g., deep learning) to detect similar features between training data input(s) 1215 in feature space using distance measures, such as cosine (or Euclidian) distance. For example, each labeled training data input 1215 is converted from string or other form into a vector (e.g., a set of real numbers) where each value or set of values represents the individual features of the search result candidate or query in feature space. Feature space (or vector space) is a collection of feature vectors that are each oriented or embedded in space based on an aggregate similarity of features of the feature vector. Over various training stages or epochs, certain feature characteristics for each input(s) 1215 can be learned or weighted. For example, for a first labeled malware signature, the most prominent feature may be a first behavior (e.g., a particular URL), whereas other features change considerably or are not present, such as causing pop-up ads to appear. Consequently, patterns of the first behavior can be weighted (e.g., a node connection is strengthened to a value close to 1), which is indicative of the label taking on this feature (whereas other node connections representing the second set of symptoms are weakened to a value closer to 0). In this way, embodiments learn weights corresponding to different features such that similar features found in inputs contribute positively for predictions.

In various embodiments, subsequent to the machine learning model(s) 1205 training on the training data input(s) 1215 (and/or testing), the machine learning model(s) 1205 (e.g., in a deployed state) receives the runtime input(s) 1203 (e.g., received from IoT devices). In various embodiments, in some embodiments, the input(s) 1203 are automatically converted to one or more feature vectors and mapped in the same feature space as vector(s) representing the training data input(s) 1215. Responsively, some embodiments determine a distance (e.g., a Euclidian distance) between the one or more feature vectors and other vectors representing the training data input(s) 1215, which is used to generate the decision statistic(s) 1207.

In an illustrative example of the decision statistic 1207, a feature vector representing pixel values of an image of the runtime input(s) 1203 may be closest to a feature vector representing a "person" classification or cluster. Accordingly, in this example, the decision statistic 1207 may be a prediction that the object associated with the runtime input(s) 1203 is classified as a "person" (e.g., based on comparing features of a runtime image to training images).

Figure 13:
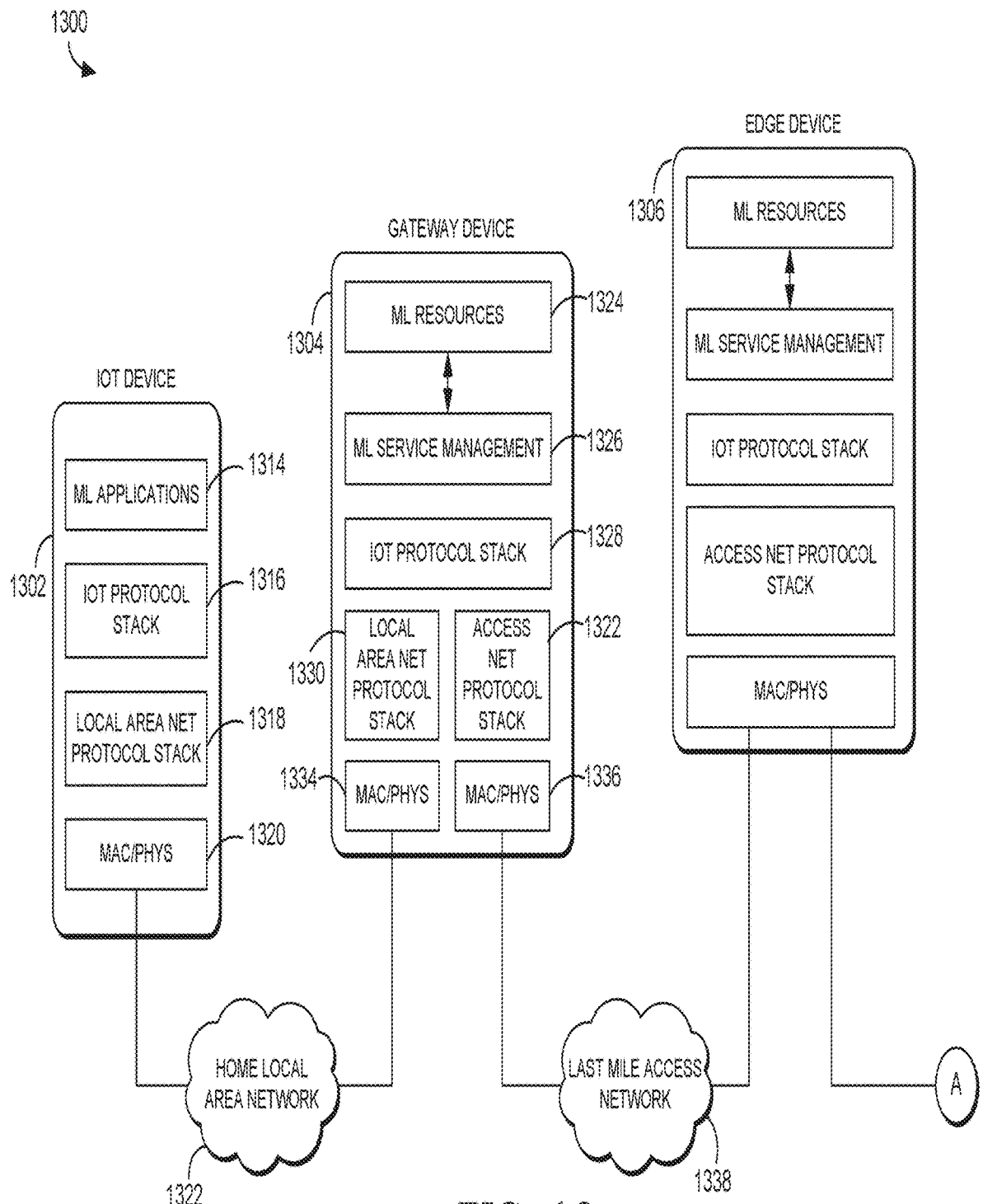
FIG. 13 is a block diagram of an example topology computing environment of ML proxy devices and ML clients in a Broadband Access Network infrastructure, according to some embodiments.
Figure 13:
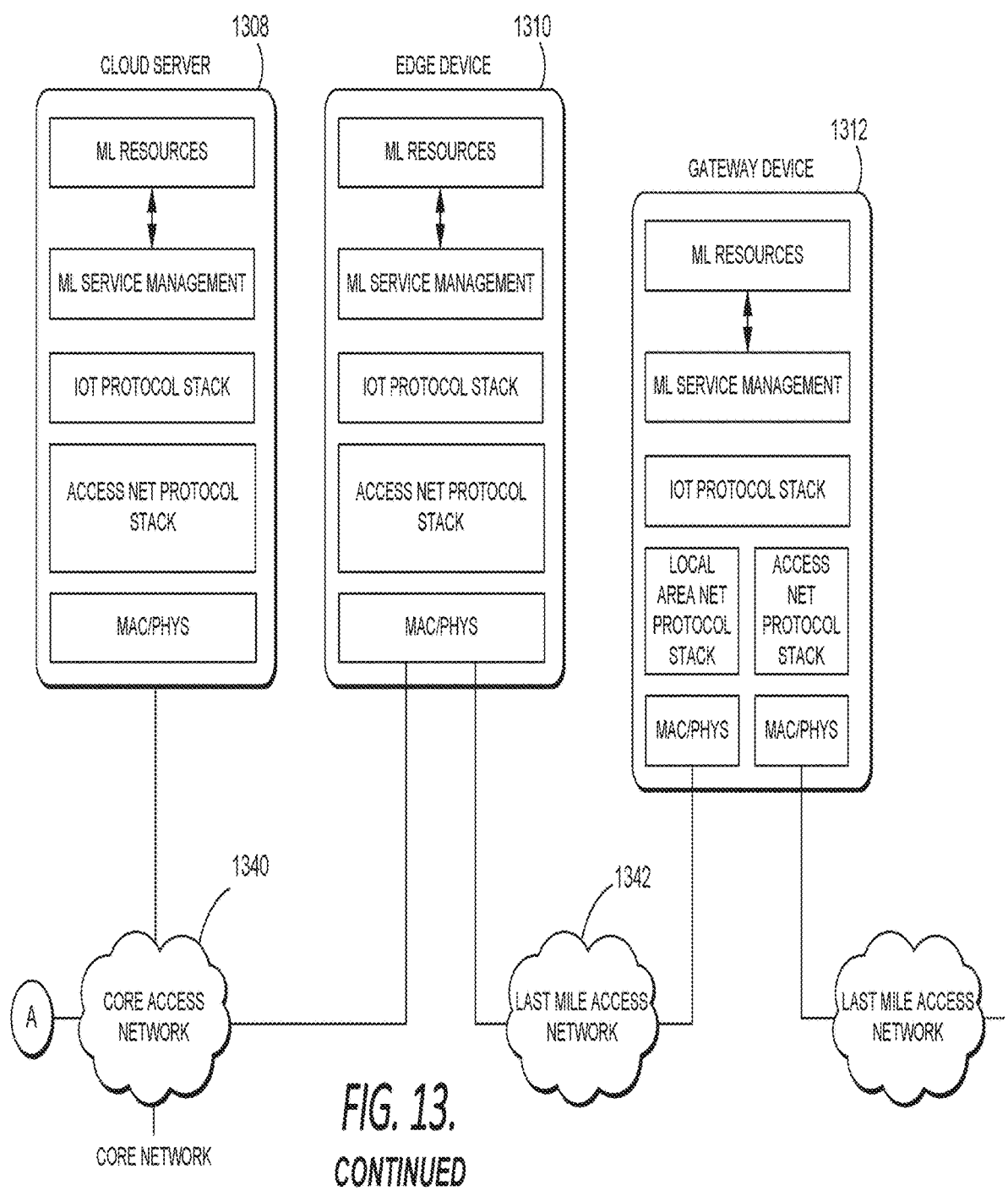

FIG. 13 is a block diagram of an example topology computing environment 1300 of ML proxy devices and ML clients in a Broadband Access Network infrastructure, according to some embodiments. In some embodiments, the computing environment 100 of FIG. 1 represents the environment 1300. In some embodiments, the computing environment 1300 represents any suitable environment described herein, such as the computing environment 200 of FIG. 2. A Broadband Access Network provides high speed internet access via multiple types of technologies, such as fiber optics wireless, cable. DSL, and satellite. The minimum upload speeds are typically a minimum of 25 Mbps download and 3 Mbps.

The environment 1300 includes the IoT device 1302, gateway devices 1304, 1312, edge devices 1306, 1310 and cloud server 1308, each of which are communicatively coupled via the networks 1322, 1338, 1340 and 1342. In some embodiments, the ML proxy devices (i.e., 1306, 1308, 1310) first advertise or share their available ML resources (i.e., machine learning capabilities and computer resource characteristics). Subsequently, a ML client device (e.g., 1302) with the ML proxy devices it is connected to (e.g., 1306), and between the ML proxy devices, to establish a ML session between the ML application and a selected ML resource. Subsequently, a ML client device and a ML proxy device transport ML application data on the ML application data path between the ML application on the ML client device and the ML resource on the selected proxy.

As illustrated in FIG. 13, when an ML application data is transported along a data path, it gets processed by various components. For example, the IoT device 1302 sends a request to process data via the ML application 1314. Such request is processed and encoded via the IoT protocol stack 1316, the local area net stack 1318, and then through the lower level MAC/PHY layer 1320. An IoT protocol stack is viewed as an extension of the TCP/IP layered protocol model. An IoT protocol stack includes a physical layer, a link layer, a network layer, a transport layer, an application protocol layer, and an application services layer. In response to the request being processed by the MAC/PHY layer 1320, it is routed, via the home local area network 1322 (e.g., computers connected via Ethernet), to the MAC/PHY layer 1334, which then partially decodes the message and passes the message to the local area net protocol stack 1330, which further decodes the message and passes it to the IoT protocol stack 1328, which converts the message into a format that the ML service management component 1326 can process. As illustrated in FIG. 13, each network device has similar components to fetch, encode, and decode a corresponding request.

Each network device includes an ML services management components (e.g., 1326), which is responsible for managing the ML resource information (e.g., 1304), as well as routing particular client requests. For example, prior to a client request via the ML application 1314, the gateway device 1306 may share its ML capability information and computer resource information to the devices 1324, 1308, and 1310 via the ML service management component 1326. Each of the other devices may likewise share their ML capability information and computer resource information to the other devices via their respective ML service management component 1326. Subsequently, for example, the ML application 1314 may issue a request to process data via one or more machine learning processes. When such request gets routed to the network device 1306, the ML service management component 1326 may look at its own ML resources 1304, as well as other ML resources of the other network devices in order to make a determination of which network device to route the request to.

Figure 14:
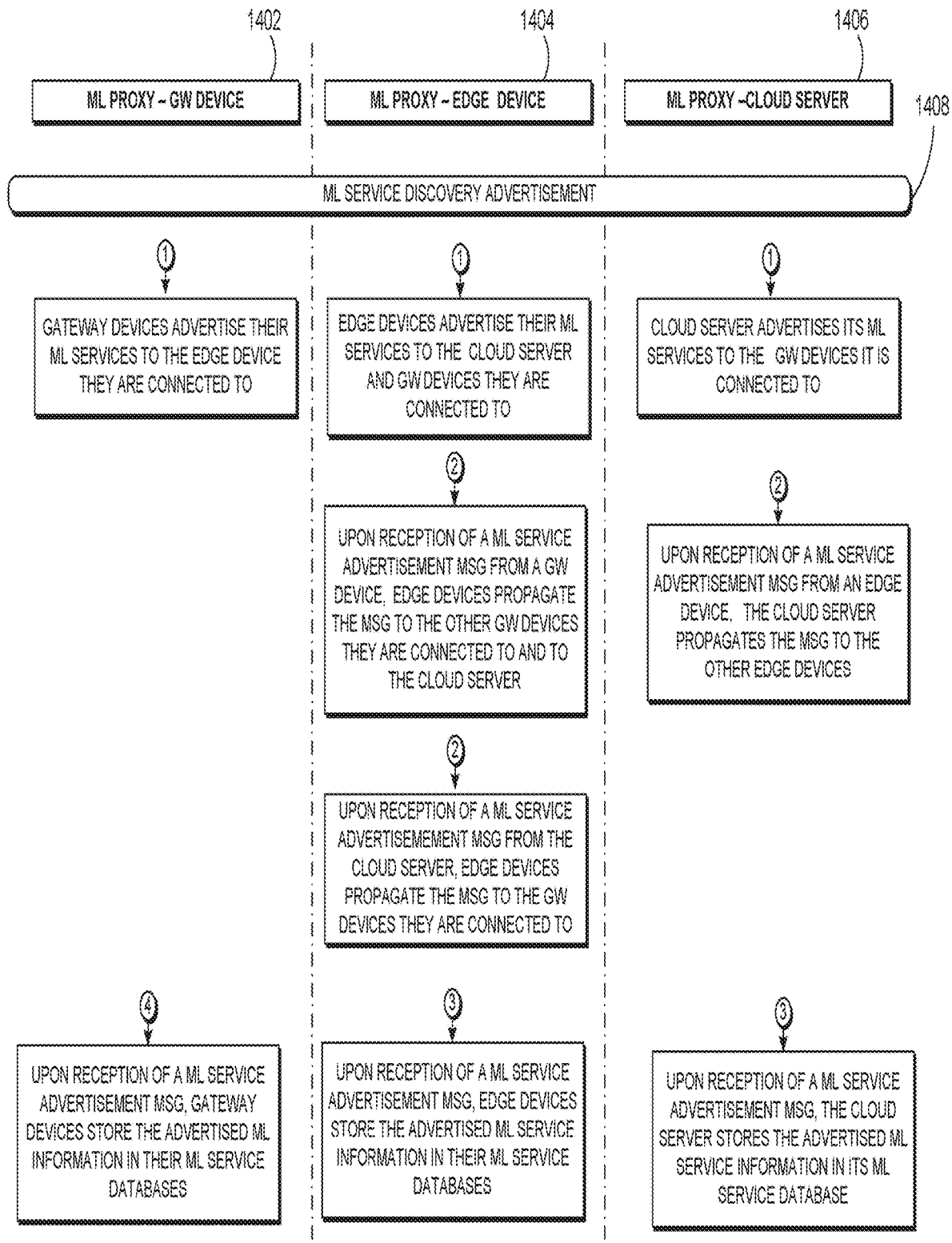
FIG. 14 is an example sequence diagram illustrating network devices sharing ML resource information, according to some embodiments.

FIG. 14 is an example sequence diagram illustrating network devices sharing ML resource information, according to some embodiments. At step 1 of FIG. 14, each network device (i.e., 1402, 1404, and 1406) advertises its ML services—ML service discovery advertisement 1408—(e.g., machine learning capability information and/or other computer resource information) to the other network device they are connected to (e.g., communicatively coupled to). This strict communication of connected network devices takes into account that in some embodiments. ML services only allow children devices to be updated only from the parent device it is connected to. The Broadband network, for example, is a strict (physical) hierarchical network where "children" devices can only directly communicate with their "parent" device (e.g., IoT device to the GWs. GWs to the Edge Devices. and Edge Devices to the Cloud Server). In these embodiments, because of the hierarchical architecture and for scalability reasons, the children devices do not have knowledge of the whole network of ML resources (e.g., the routing resource list 120) but only of the ML resources advertised by their parent device. In various instances, an IoT device will always send a ML resource request to its own GW, which could either handle the request with its own local resources (e.g., ML core) or propagate the request to its parent device (e.g., the Edge that, in turn, could do the same but this will be hidden from the children devices). Accordingly, each network device along the chain makes its own "routing" determinations to establish the virtual service channel between the ML application and the ML model.

At step 2 of FIG. 14, in response to the receiving of the ML service advertisement message from step 1, the respective network devices (i.e., 1404 and 1406) propagate the message (the ML service advertisement) to the corresponding devices. Continuing with step 2, in response to receiving a ML service advertisement message from the cloud server 1406, the edge device(s) 1404 propagate the message to the GW devices 1402 they are connected to. At step 3, in response to the reception of the ML service advertisement message, the corresponding network devices (i.e., 1404 and 1406) store the advertised ML service information in their corresponding ML service databases. At step 4, in response to the reception of a ML service advertisement message, the ML proxy 1402 (and all GW devices) store the advertised ML information in their ML service databases.

Figure 15:
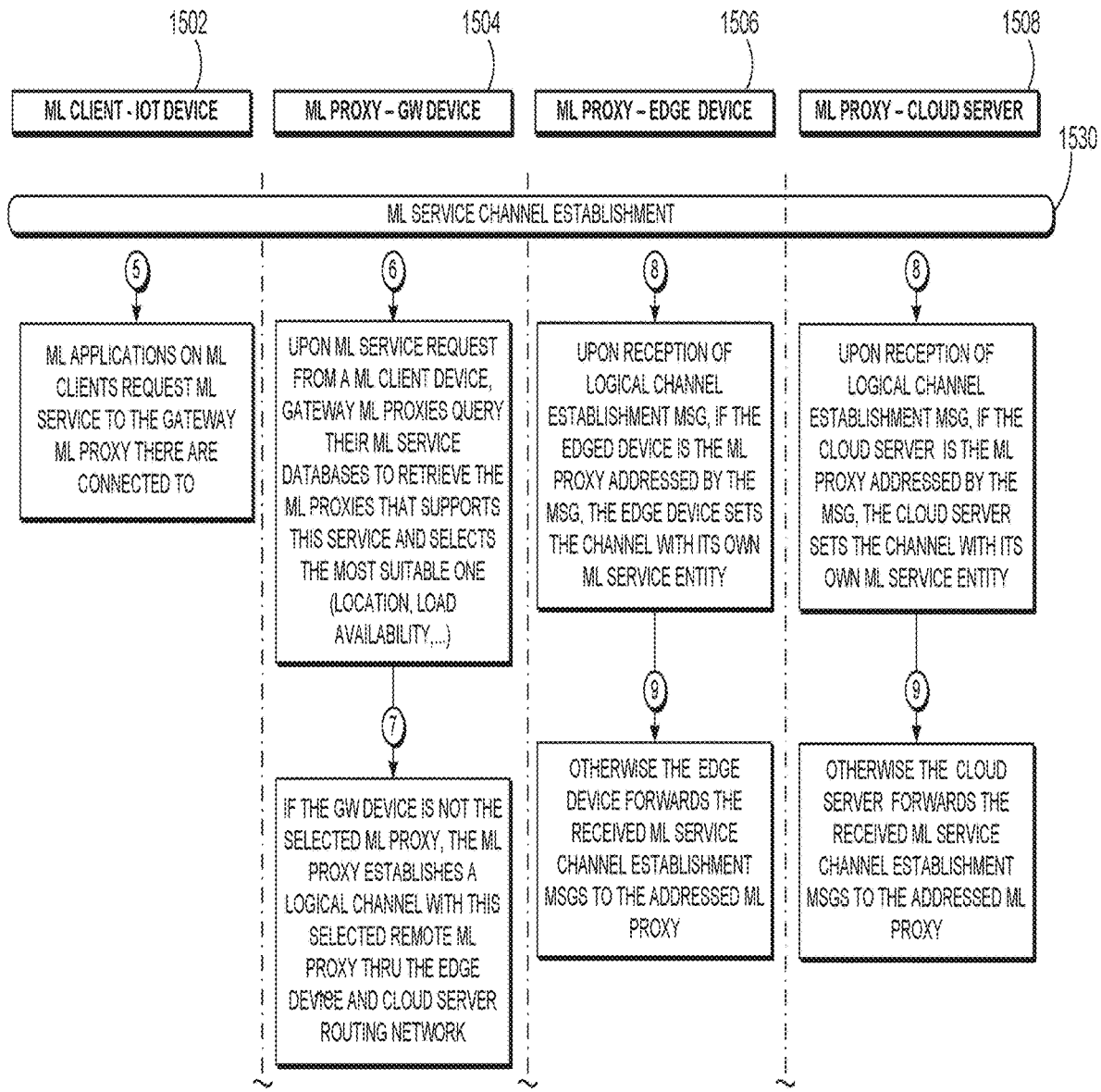
FIG. 15 is an example sequence diagram illustrating network devices establishing a ML service channel and processing a client request to process data via one or more machine learning processes, according to some embodiments.
Figure 15:
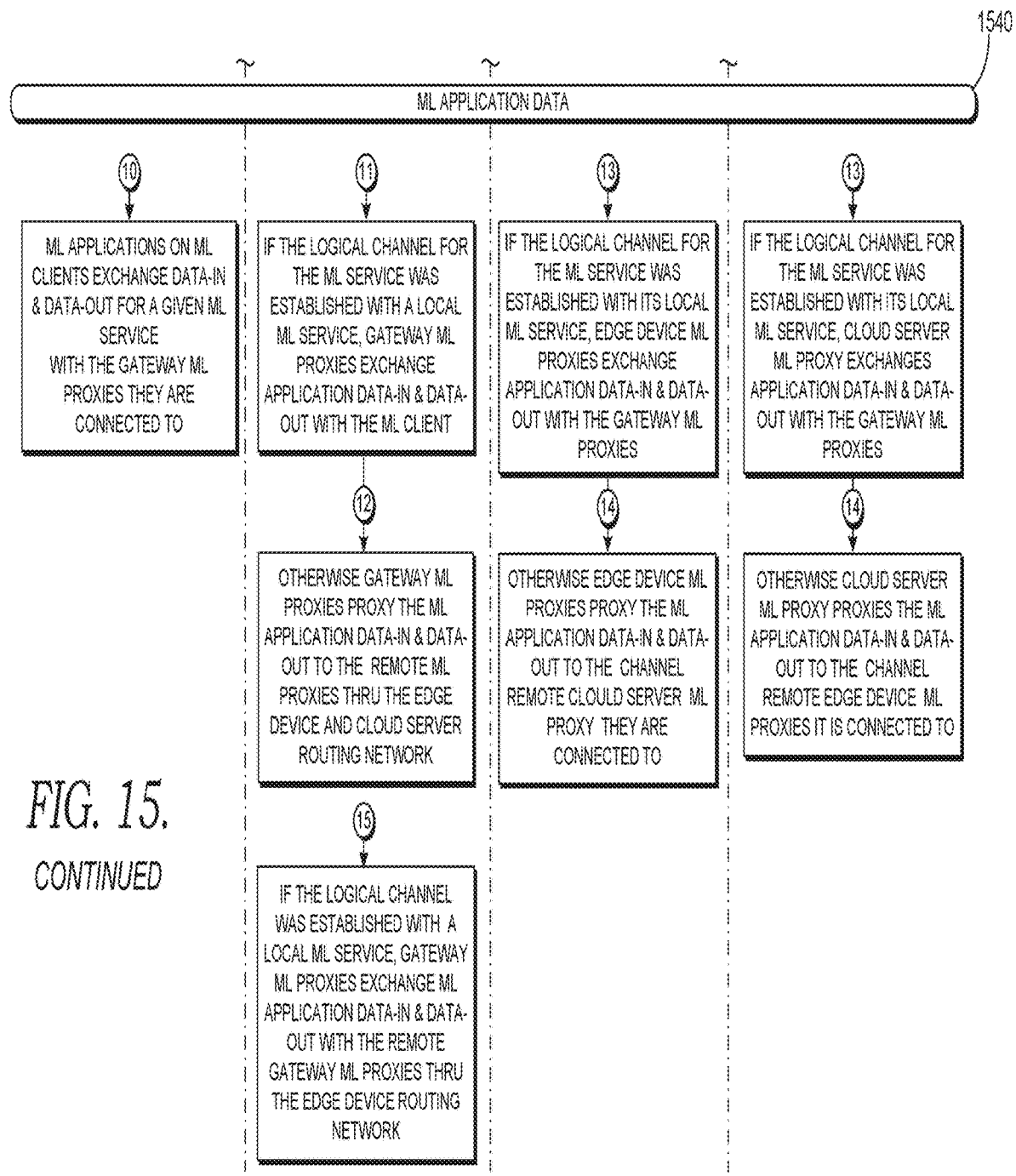

FIG. 15 is an example sequence diagram illustrating network devices establishing a ML service channel and processing a client request to process data via one or more machine learning processes, according to some embodiments. In some embodiments, the steps of FIG. 15 occur subsequent to the steps of FIG. 14 and the network devices are the same network devices. For example, the ML proxy 1402 may represent the ML proxy 1504, the ML proxy 1404 may represent the ML proxy 1506, the ML proxy 1406 may represent the ML proxy 1508

Subsequent to the ML service discovery advertisement layer (e.g., FIG. 14) performing its functionality, the ML service channel establishment layer 1530 is performed in order to establish a communication session between a client devices and one or more network devices and make routing decisions for requests. In various embodiments, the communication channel is and end-to-end virtual connection between the ML application client device and the device executing the ML model for the particular application. As such, subsequent to the channel being established, the network devices between these two ends are acting as bridges. Specifically, per step 5 (which occurs subsequent to step 4 in FIG. 14), the ML application on the IoT device(s) 1502 requests ML service to the gateway proxy(s) 1504 that they are communicatively coupled to. Per step 6, in response to receiving the ML service request from the IoT device(s) 1502, the GW device(s) 1504 query their ML service databases to retrieve a list of the ML proxies (network devices) that supports this service (e.g., object detection) and selects the most suitable one. Per step 7, if the GW device at step 6 is not the selected ML proxy, the ML proxy establishes a logical channel with the selected ML proxy through the edge device and cloud server routing network.

Per step 8, in response to the receiving of the logical channel establishment message, if the edge device(s) 1506 and cloud server 1508 are the ML proxies addressed by the message, the edge device(s) 1506 and cloud server 1508 sets the channel with their own ML service entity. Per step 9, if the edge device(s) 1506 and the cloud server 1508 are not the ML proxies addressed by the message, the edge device(s) 1508 and the cloud server 1508 forwards the received ML service channel establishment message to the addressed ML proxy.

In response to the ML service channel establishment layer 1530 performing its functionality, the ML application data is actually processed via the ML application data layer 1540. Specifically, per step 10, the ML applications on the IoT device(s) 1502 exchange data in and data out (take some data as parameters, return some data as output) for a given ML service with the gateway proxy(s) 1506 they are communicatively coupled to. Per step 11, if the logical channel for the ML service was established (e.g., via the ML service channel establishment 1530) with a local ML service, the gateway device(s) 1504 exchange application data-in and data-out with the IoT device(s) 1502. Per step 12, if the logical channel for the ML service was not established with the local ML service, the gateway device(s) 1504 proxy or route the ML application data-in and data-out to the remote ML proxies through the edge device(s) 1506 and the cloud server 1508 routing network.

Per step 13, if the logical channel for the ML service was established with its local ML service, the edge device(s) 1506 and cloud server 1508 ML proxies exchange their application data-in and data-out with the gateway device(s) 1506. Per step 14 if the logical channel for the ML service was not established, the edge device(s) 1506 and the cloud server 1508 proxy or route the ML application data-in and data-out to the channel remote gateway device(s) 1504 they are communicatively coupled to. Per step 15, if the logical channel was established with a local ML service, the gateway device(s) 1504 exchange ML application data-in and data-out with the remote gateway ML proxies through the edge device(s) 1506 routing network.

Figure 16:
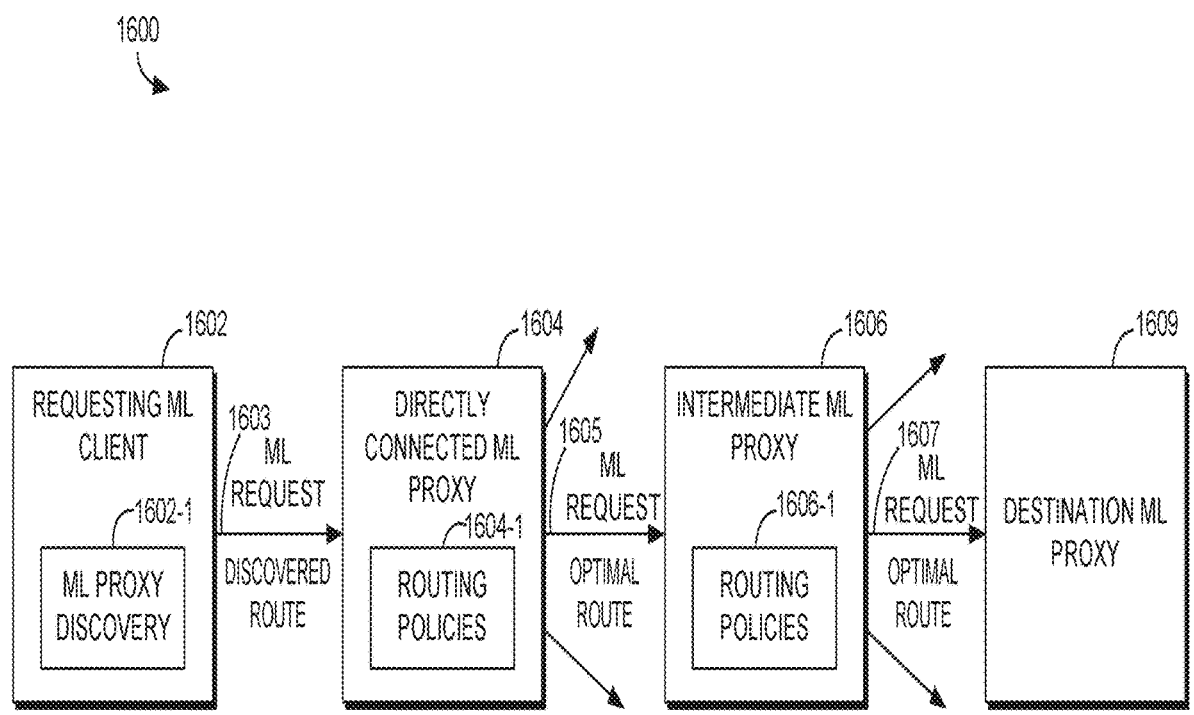
FIG. 16 is a block diagram illustrating how a ML request is routed from a client to a destination client device, according to some embodiments.

FIG. 16 is a block diagram illustrating how a ML request is routed from a client to a destination client device, according to some embodiments. As described herein, ML processing resources (i.e., ML capabilities and computer resource characteristics) are distributed throughout the network and are optimally shared among all ML clients residing within the ML network. The optimal sharing is achieved by routing the ML request from the ML clients to the most suitable ML proxies or network devices that host the ML resources for processing the requests. In some embodiments, such routing decisions are made according to the routing policies configured in the ML proxies along the data path from the ML client to the destination ML proxy that hosts the corresponding ML resources.

FIG. 16, for example, illustrates one intermediate proxy 1606 between the ML proxy 1604 that is directly connected with the requesting ML client 1602 and the destination ML proxy 1609. Specifically. FIG. 16 illustrates that the requesting ML client 1602 (e.g., an IoT device or client device 102), having read a ML proxy discovery data store 1602-1, routes the ML request 1603 to the directly connected ML proxy 1604 (e.g., network device 116). The proxy 1604 may use the routing policies 1604-1 to route the request 1605 to the intermediate ML proxy 1606, which may use its routing policies 1606 to route the ML request 1607 to the destination ML proxy 169.

The "optimal route" for routing and the "routing policies" as described herein can refer to any suitable policy as described herein, such as policies based on ML learning capabilities and/or computer resource characteristics (i.e., ML resources). In some embodiments, the default routing policies are assigned to the ML proxies during initialization (e.g., ML service advertisements) and can be dynamically configured during operations according to multiple factors, including network traffic status, and the operational status of the ML proxies, such as ML processing loads (e.g., in terms of CPU and memory consumption). In some embodiments, the routing policies take into considerations of the optimization factors (which may all be included in the routing resource list 120) such as: latencies for ML processing and data transmission (required by ML clients); ML processing capacities (e.g. supported ML models and model performance); priorities of the ML requests, which can be assigned per ML client or per ML application; QoS requirements (including real-time, latency, data rate requirements) of the ML applications; and ML input and output locations within the network.

In some embodiments, the routing decisions are determined by the routing determiner 104 of FIG. 1. In some embodiments, routing decisions are made hop-by-hop, starting at the direct ML Proxy (e.g., 1604) that the requesting ML client is connected with. This proxy decides whether or not it can process the request from the ML client according to its configured routing policies. If not, it selects another ML Proxy (e.g., 1606) that it is directly connected with, again according to the configured routing policies, and forwards the request to the selected ML Proxy. Such chained decisions are propagated towards the destination ML Proxy (e.g., proxy 1609) that will process the original request.

The ML requests (e.g., 1603) from the ML clients contain information about the requesting ML applications. This information enables application-dependent routing decisions, as described above. In some embodiments, when the request is forwarded from one hop to the next, it can include any appropriate routing information that reflects the accumulative routing decisions that have been made so far, so that the next hop can take such information into consideration when making its own routing decision. As an example, the original ML request 1603 from the ML client 1602 may contain a latency bound budget that is required by the ML application. In this case, each ML proxy determines the latency for its internal processing as well as the latency for transmitting the request to the next hop that it selected. It then deduces these latencies from the latency bound budget in the ML request before transmitting the request to the next hop. Another example of the routing information added to the ML request is the routing addresses (e.g. IP address, port number, and domain name) of all network devices along the end-to-end route from the requesting ML client to the destination ML proxy 1609. This information can be used to route the response from the destination ML proxy 1609 back to the requesting ML client 1602.

Figure 17:
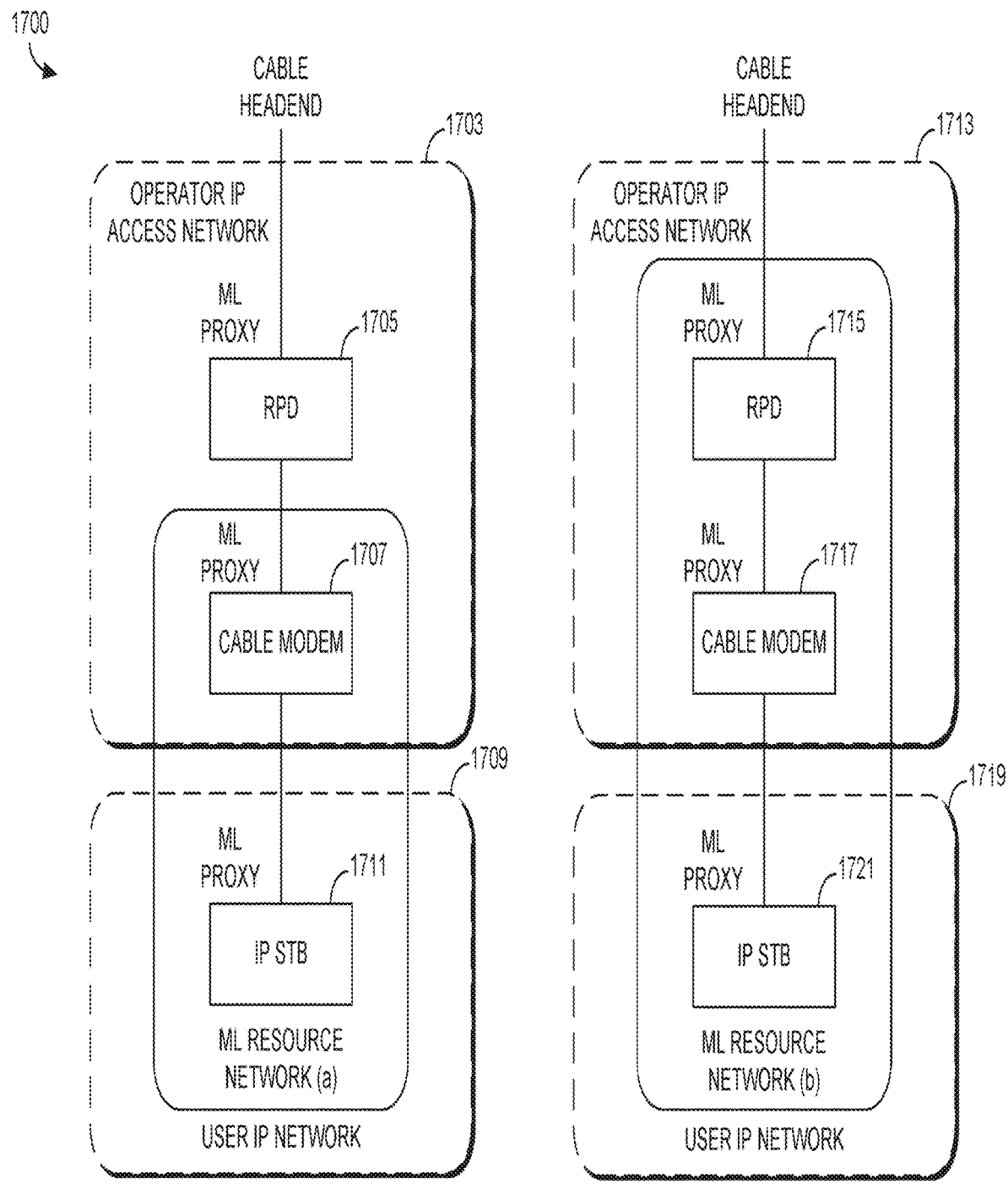
FIG. 17 is a block diagram illustrating ML network (a) and ML network (b) in a cable broadband access network infrastructure, according to some embodiments.

FIG. 17 is a block diagram illustrating ML network (a) and ML network (b) in a cable broadband access network infrastructure, according to some embodiments. FIG. 17 illustrates that the Internet Protocol Set-top boxes (IP STB) 1711 and 1721 are the ML clients 1709 and 1719 (e.g., the client device(s) 102) respectively, while the cable modems 1707 and 1717 and the Remote PHY device (RPD) 1705 and 1715 are ML proxies (e.g., the network devices 116, 112, and 106).

Assuming that there are two MML applications in the IP STB, for the ML client 1709, the following information is included in the ML requests: (1) the budge for total processing and communication latencies incurred by the ML proxies, denoted by L; and (2) the required ML model, as denoted by Ma. If it is assumed that the ML proxy within the cable modems 1707 and/or 1717 supports only the model Ma, and the total processing latency for this model within the cable model is Lcm<L, the cable modem itself is able to serve the requests from the ML client 1709, without forwarding the requests to any other proxy.

For the ML client 1719 (corresponding to ML resource network (b)), the following information is included in the ML requests: (1) the budget for total processing and communication latencies incurred by the ML proxies, denoted by L; and (2) the required ML model, as denoted by Mb. In various embodiments, it is assumed that the ML proxy within the RPD 1715 supports the model Mb and the processing latency within the RPD 1715, and the communication latency between the cable modem 1717 and the RPD 1715 are Lrpd and Lcom, respectively. Further, in some embodiments it is assumed that Lcm+Lrpd+Lcom<L. In this case, the cable modem 1717 itself is not able to serve the requests from the ML client 1719, since it does not support the model Mb. In some embodiments, through ML resource discovery process, as described herein (e.g., 1420 of FIG. 14), the ML proxy within the cable model 1717 is made aware that the model Mb is supported at the directly-connected (e.g., directly-attached) RPD. Therefore, the cable modem 1717 forwards the request for this application to the RPD 1715, with the included latency budged being decremented by Lcom. In some embodiments, also included in the request is the contact address (e.g., IP address) for the cable modem 1717. Upon receiving the ML request, the RPD 1715 concludes that it is able to serve the request since it supports M and Lcm+Lrpd+Lcom<L.

Figure 18:
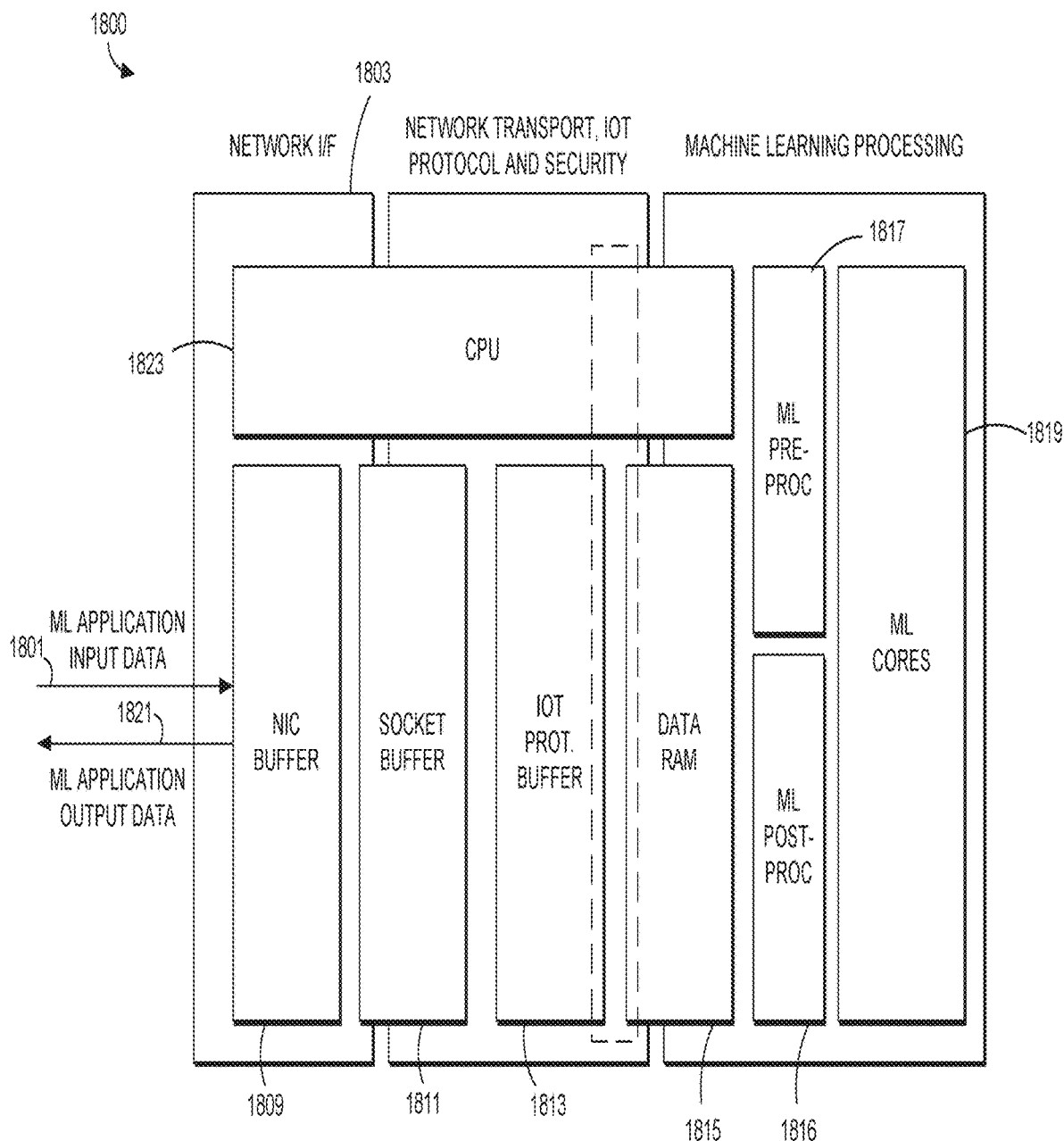
FIG. 18 is a block diagram of an example ML proxy device, according to some embodiments.

FIG. 18 is a block diagram of an example ML proxy device 1800, according to some embodiments. In various embodiments, the ML Distributed Processing protocol messages 1801 sent by a ML Proxy device (or client device) to the ML proxy device 1800 (and ML client devices) over the network medium are encapsulated by the IoT protocol entity 1805 that runs on the CPU 1823, into IoT Transport data units. These data units are (optionally encrypted and) encapsulated by the network transport service driver (not shown) of the network interface 1803 into network protocol data units sent to the network interface controller (not shown) of the network I/F 1803. In some embodiments. ML Distributed Processing protocol messages received from other ML proxy and ML client devices over the network medium are (optionally decrypted and) presented to the IoT protocol entity 1805 thru the network socket interface.

In some embodiments, the IoT protocol entity 1805 decapsulates these data units to retrieve the data payload which could either be ML Distributed Processing control messages (e.g., messages to route certain requests to certain network devices) and/or ML application input data (e.g., a video stream of objects). If the payload data are ML application input data, they are stored in the Data RAM 1815 to be pre-processed by the ML pre-processor 1817 before being presented to the ML Core(s) 1819 for ML Processing. ML application output data 1821 are created by the ML Core(s) 1819, post processed by the ML post-processor 1815, and stored in Data RAM 1813, then encapsulated by the IoT protocol entity 1805 for transmission as described above.

Specifically, the ML application input data 1801 is sent to the NIC buffer 1809 and the socket buffer 1811 of the network I/F 1803. A Network Interface Card (NIC) buffer is a memory storage area that is configured to store packets awaiting transmission over networks or store packets received over networks. A socket buffer is a memory storage area or structure that controls and stores state information for a socket layer. The request 1801 responsively gets routed to the IoT protocol buffer 1813. An IoT protocol buffer is a memory storage area or structure that holds or temporarily stores data in preparation to be processed by a machine learning core. Responsively, the request 1801 gets routed to the Ml pre-processing 1817 (e.g., 514 of FIG. 5), and then to the machine learning core(s) 1819. Responsive to the processing by the machine learning core(s) 1819, the processed data goes to the ML post process 1815 (e.g., 810 of FIG. 8), and the resulting ML application output data 1821 gets routed to another network device or back to the client device.

Figure 19:
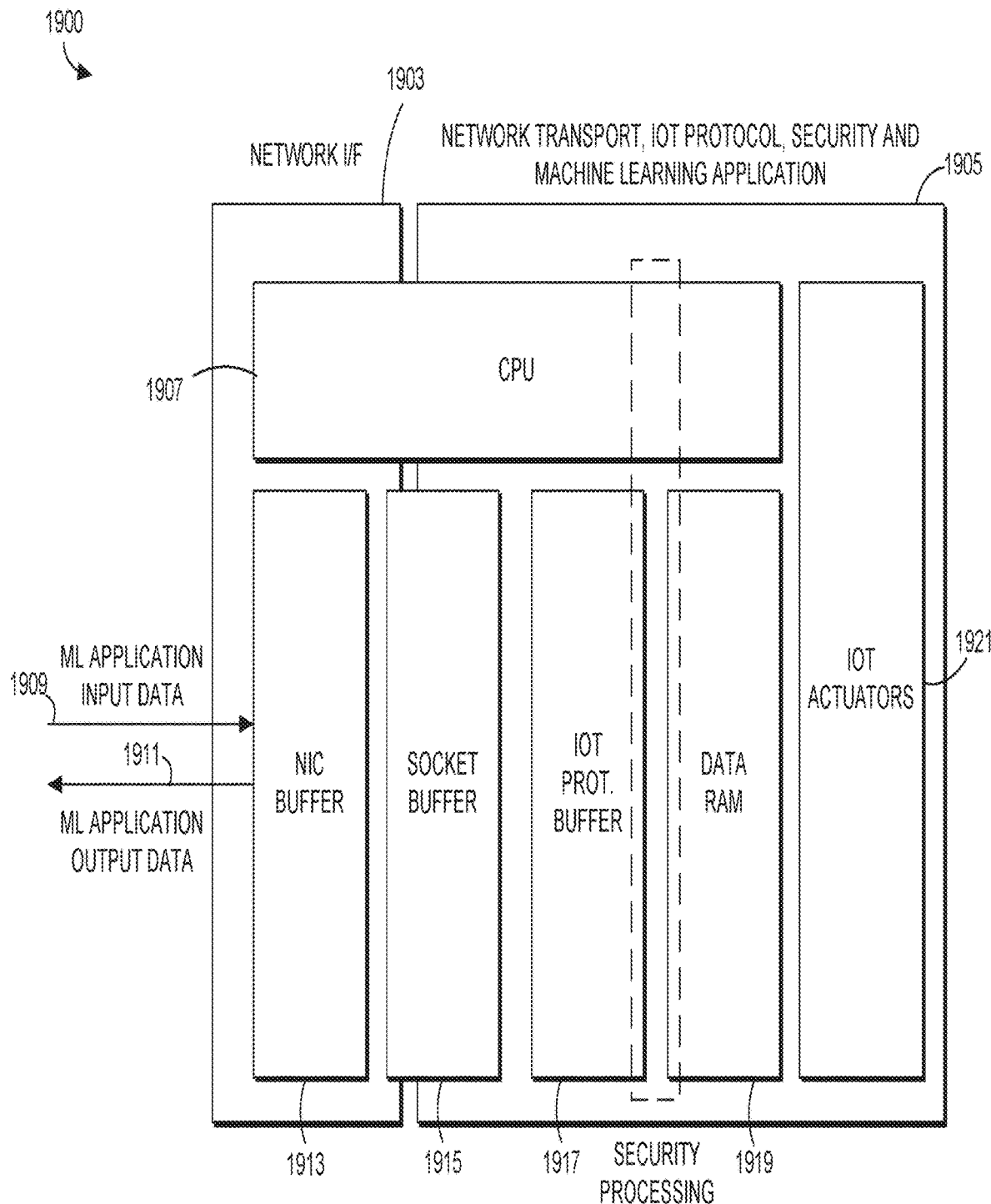
FIG. 19 is a block diagram of an example client device, according to some embodiments.

FIG. 19 is a block diagram of an example client device, according to some embodiments. FIG. 19 illustrates that a client request (i.e., ML application input data 1909) requesting one or more machine learning processes to be performed by one or more network devices is sent from the client device 1900. Responsive to the request being routed and processed by the network devices, the data (i.e., ML application output data 1911) is provided back to the client device 1900.

Specifically, ML application input data 1909 from the ML application, which is run on the CPU 1907, are sent through the ML distributed processing protocol 1905 by the ML client device 1900 to the ML proxy devices (e.g., proxy device 1800) over the network medium. These data together with the ML Distributed Processing protocol messages are encapsulated by the IoT protocol entity 1905 that runs on the CPU 1907 into IoT Transport data units. These data units are (optionally encrypted and) encapsulated by the Network transport service driver into network protocol data units sent thru the network socket interface 1903 to the network interface controller. ML Distributed Processing protocol data received from ML proxy devices over the network medium are (optionally decrypted and) presented to the IoT protocol entity thru the network socket interface 1903.

The ML application output data 1911 is first received and processed through the NIC buffer 1913 and the socket buffer 1915. The IoT protocol entity 1905 decapsulates these data units to retrieve the data payload which could either be ML Distributed Processing control messages (e.g., a control signal) or M L application data (e.g., object detected and zoomed-in data).

If the payload data are ML application data, they are stored in the Data RAM 1919 to be presented to the ML Application. The IoT protocol entity 1905 decapsulates these data units to retrieve the data payload which could either be ML Distributed Processing control messages or ML application data. If the payload data are ML application input data, they are stored in the Data RAM 1919 to be pre-processed by the ML pre-processor before be presented to the ML Cores for ML Processing.

When the payload is ML Distributed Processing control messages, they are sent to the IoT actuators 1921, which causes some tangible action to a device via a control signal. An IoT actuator takes electrical input and turns it into a physical action. For example, the IoT actuators 1921, can physical set the temperature on a smart thermostat, physically turn on/off lights, cause a television to turn on/off, turn a washing machine on/off, cause a smart speaker to make an utterance, and the like.

Figure 20:
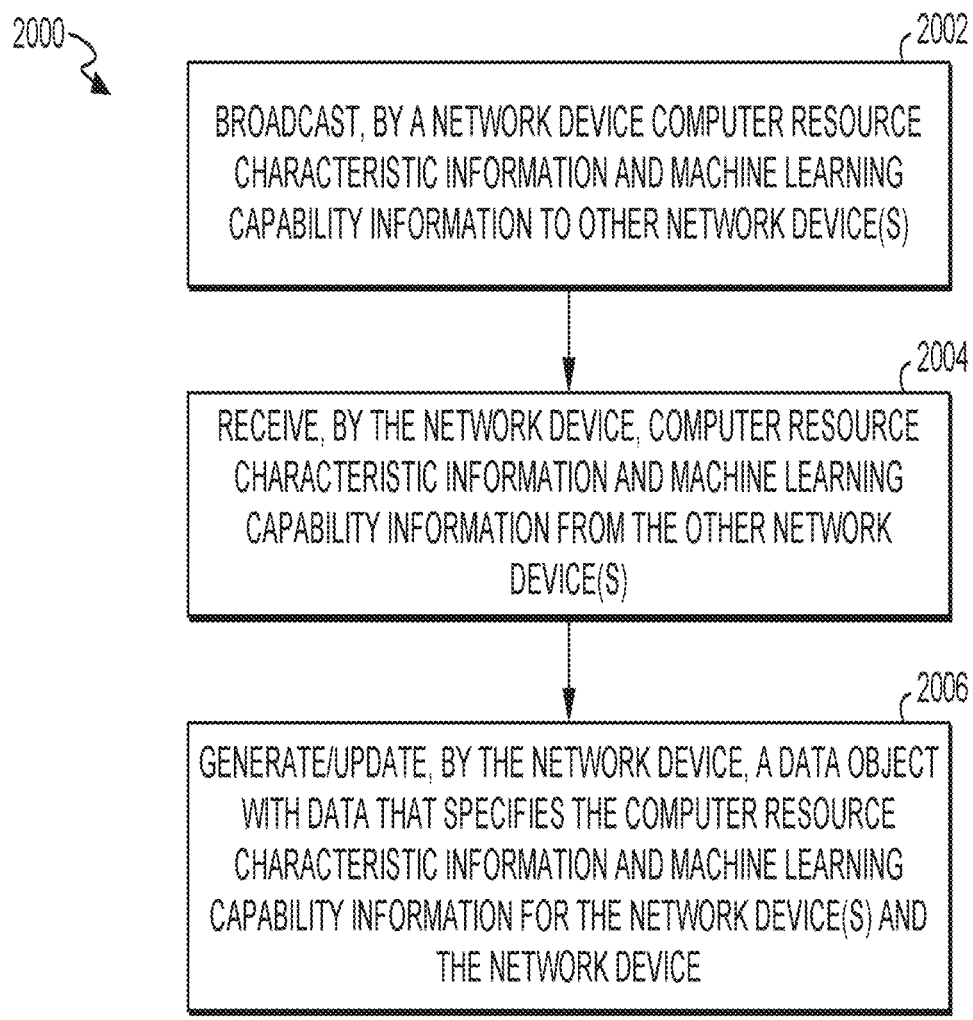
FIG. 20 is a flow diagram of an example process for generating or updating a data object with data specifying the computer resource characteristic information and machine learning capability information for the network devices, according to some embodiments.

FIG. 20 is a flow diagram of an example process 2000 for generating or updating a data object with data specifying the computer resource characteristic information and machine learning capability information for the network devices, according to some embodiments. In some embodiments, the process 2000 represents an offline or non-runtime process before a client request is processed (e.g., via the process 2100 of FIG. 21). In some embodiments, the process 200 represents an online or runtime process that is performed in response to a client request. In some embodiments, the process 200 is a combination of online and offline processes. For example, at block 2004, the machine learning capability information can be received offline before a client request and the computer resource characteristic information can be received in response to a client request to determine real-time (or near-real-time) computer resource characteristics of a particular network device.

The process 2000 (and/or any of the functionality described herein (e.g., process 2100)) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system, and/or the computer program product/computer readable storage medium as described herein may perform or be caused to perform the processes 2000 and/or 2100 or any other functionality described herein.

Per block 2002, a network device broadcasts its own computer resource characteristic information and machine learning capability information to one or more other network devices. Examples of this are described with respect to the ML service discovery layer 120 steps of FIG. 14 and the ML service discovery advertisement layer 1520 of FIG. 15. For example, the GW device 1414 of FIG. 14 at step one transmits a "ML service advertisement" to the edge device 1412. In another example, the network device 116 of FIG. 1 can broadcast its sub-resource list 120-3 to the other network devices 106 and 112 so that these other network devices 106 and 112 have ML resource information concerning network device 116.

Per block 2004, the network device receives computer resource characteristic information and machine learning capability information from the other one or more network device(s). Examples of this are described with respect to the ML service discovery layer 120 steps of FIG. 14 and the ML service discovery advertisement layer 1520 of FIG. 15. For example, at step 3, the GW device 1414 can receive the computer resource characteristic information and machine learning capability information of the edge device 1412 from the edge device 1412. In another example, the network device 116 can receive the sub-lists 120-1 and 120-2 from the network device 112 and 106 respectively.

Per block 2006, the network device generates and/or updates a data object (e.g., a list or other data structure) that specifies the computer resource characteristic information and machine learning capability information for the one or more network devices and the network devices. Examples of this are described with respect to the ML service discovery layer 120 steps of FIG. 14 and the ML service discovery advertisement layer 1520 of FIG. 15. For example, the "add" steps of FIG. 14 may include this functionality (e.g., step 5 of "Add (ML_i) to ML service database. In another example, the final resource list 120 may correspond to an updated list, with sub-lists 120-1 and 120-2 being the updates.

Figure 21:
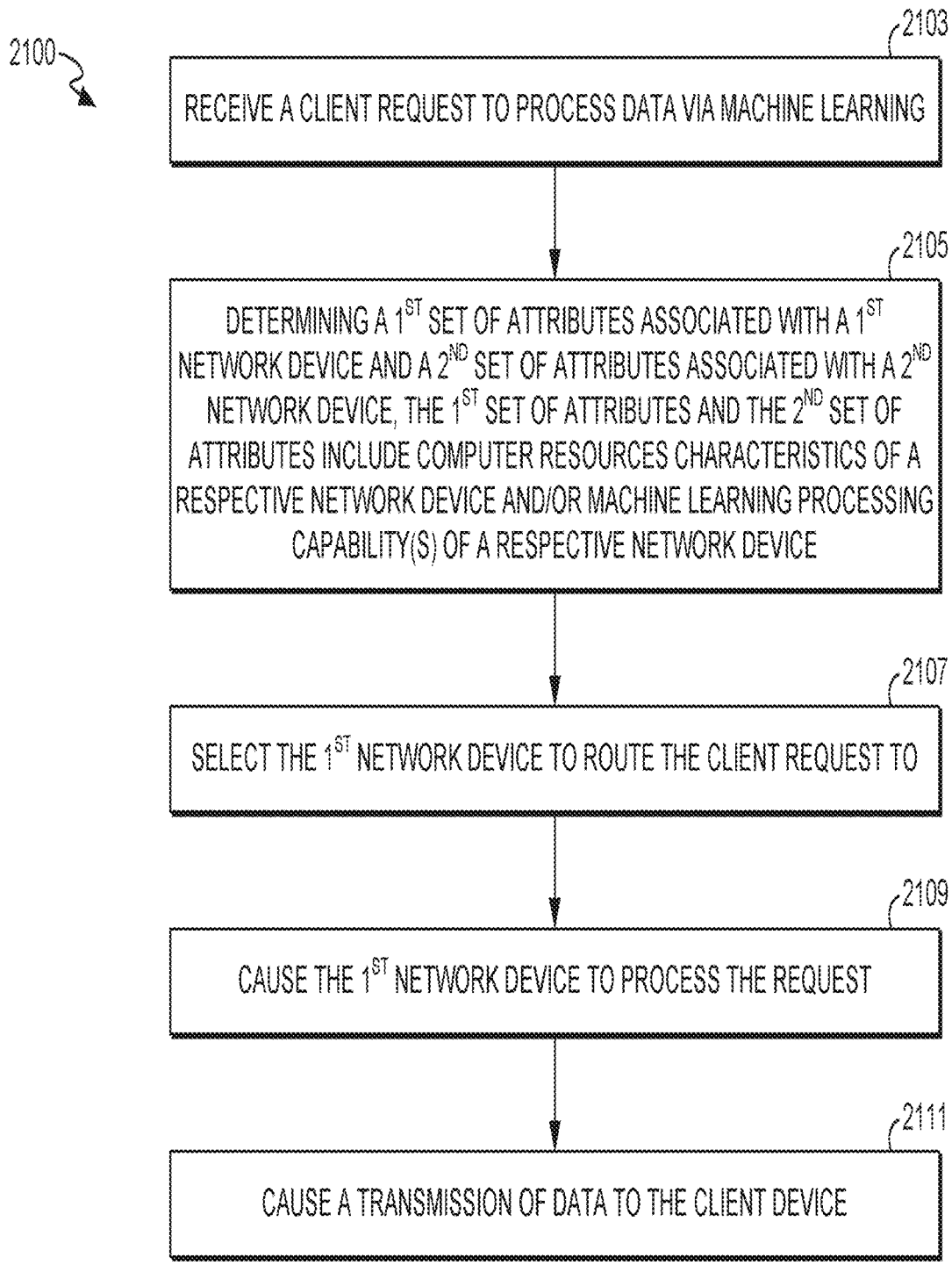
FIG. 21 is a flow diagram of an example process for executing a client request to process data via one or more machine learning processes, according to some embodiments.

FIG. 21 is a flow diagram of an example process 2100 for executing a client request to process data via one or more machine learning processes, according to some embodiments. In some embodiments, the process 2100 represents runtime or online functionality and occurs subsequent to the process 2000 of FIG. 20.

Per block 2103, a client request to process data via one or more machine learning processes is received. The client request may originate from a client device (e.g., an IoT device). In an illustrative example, a network device may receive a transmitted client request, which is request to detect and follow an object in a video stream. In some embodiments, block 2103 includes establishing a ML service channel between a client device and network device(s). Examples of this are described with respect to the ML service channel creation steps at the ML service channel creation 1430 and/or the ML service channel establishment layer 1530. In an illustrative example of block 2103, subsequent to step 7 of FIG. 14, the GW device 1406 receives the ML service request to establish a connection with the GW device 1406, and all the other channels are opened via steps 8, 9, 10, and 11. In another example of block 2103, is steps 8, 9, 10, and/or 11 may occur.

Alternatively or additionally, block 2103 may include receiving the actual payload (e.g., a request to detect and follow an object in a video stream) of the request after a channel has been established between the client device and network device(s). Examples of these embodiments include the receiving steps performed by the ML proxy devices in the ML application data 1440 layer of FIG. 14 (e.g., the GW device 1406 receives the ML application data transmitted at step 12 by the IoT device 1402), and the receiving steps at the ML application data layer 1540 of FIG. 15 (e.g., the exchange of data-in and data-out at steps 13 and 14). Other examples include when the network device 1800 receives the ML application input data 1801, or when the network device 116 receives the request 150 from the client device 102.

In some embodiments, the client device that transmits the request at block 2103 is an Internet of Things (IoT) device and/or an Internet of Everything (IoE) device. For example, a client device can be a connected appliance (e.g., smart washing machine, smart dish washer, smart thermostat), a smart home security system, smart television, wearable health monitor, smart light system, people (e.g., smart phones), cars, and the like.

Per block 2105, a first set of attributes associated with a first network device and a second set of attributes associated with a second network device are determined. The first set of attributes and the second set of attributes include computer resource characteristics of a respective network device and/or machine learning processing capabilities of a respective network device. For example, the network device 116 of FIG. 1 may determine these characteristics of itself and network device 112 by reading the sub-lists 120-1 and 120-3. In some embodiments, block 2105 occurs in response to block 2103

In some embodiments, block 2105 alternatively or additionally "compares" at least a first portion of the first set of attributes with at least another portion of the second attributes. For example, in response to receiving the request at block 2103, a client device may compare attributes of network devices in order to determine where to route the request to based on which network device is more compute resource efficient or has more capable machine learning functionality to service the request. In an illustrative example, the network device 116 of FIG. 1 may compare real-time Memory capacity, CPU, or other computer characteristics of network device 112 (via the sub-resource list 120-1) with its own computer characteristics (via the sub-resource list 120-3). In another illustrative example, the network device 116 of FIG. 1 may compare ML capabilities (e.g., ML model type hyperparameters, etc.) of different network devices. Alternatively or additionally block 2015 may include "comparing" the payload of the request to attributes of each network device (e.g., the resource list 120) to determine where to route the request.

In some embodiments, the first network device is located in a first layer (e.g., layer N of FIG. 1) of a hierarchical computer network, where the first network device has a first machine learning core (e.g., ML core 114 of FIG. 1). For example, referring back to FIG. 2, the first layer may be the "edge layer" (or "edge ML proxy subnetwork" of FIG. 4) and the first network device may be the edge device 209 that exists within a broadband access network, which is an example of a hierarchical network. In some embodiments, the second network device is located in at least one of the first layer or a second layer of the hierarchical computer network, where the second network device has a second machine learning core. For example, the second layer can be the "CPE layer" of FIG. 2 and the second network device can be the set-top box 203 of FIG. 2. Alternative to these example, the layers or network devices can be any suitable layers and network devices described with respect to FIG. 1. FIG. 2, or FIG. 3. As described herein, the terms "first" and "second" layer or network device do not denote order of processing, but rather indicate that they are separate or distinguishable layers or devices.

In some embodiments, the one or more computer characteristics include one or more of a data transmission rate (e.g., megabits per second), processing capacity (number of operations a processor can perform in a set amount of time), transport protocol (e.g., TCP/IP, UDP. IoT, etc.), latency (e.g., Round Trip Time (RTT) or the Time to First Byte (TTFB)), bandwidth, memory capacity or availability, and security. Security refers to the different security attributes or capabilities that a network device employs (e.g., whether a network device employs encryption, obfuscation, the type of authentication, the type of malware that a network device can detect, etc.).

In some embodiments, the one or more machine learning capabilities include one or more of a machine learning model type hosted on a respective network device (e.g., CNN, Random Forest, Long Short Term Memory (LSTM). Recurrent Neural Network (RNN). Gaussian Mixture Model (GMM). BERT, WORD2vec, supervised learning, unsupervised learning, classifier, clustering model, regression model, etc.), hyperparameters used in a respective machine learning model, input data preprocessing functions, output data post-processing functions, and data paths for input and output data flows.

In machine learning, a hyperparameter is a parameter whose value is used to control the learning process. By contrast, the values of other parameters (typically node weights) are derived via training. Hyperparameters can be classified as model hyperparameters, that cannot be inferred while fitting the machine to the training set because they refer to the model selection task, or algorithm hyperparameters, that in principle have no influence on the performance of the model but affect the speed and quality of the learning process. An example of a model hyperparameter is the topology and size of a neural network. Examples of algorithm hyperparameters are learning rate and mini-batch size. "Data paths" refers to the hardware (functional units) that performs all the required operations, for example, ALU, registers, and internal buses within a CPU.

"Input pre-processing functions" convert raw data into a clean data set in preparation to be processed through a machine learning model. These functions may indicate whether the pre-processing employs the following or type of: acquire the dataset, import all the crucial libraries, import the dataset, identifies and handles the missing values, encodes the categorical data, splits the dataset, indicates whether preprocessing transforms the data using a binary threshold. All values above the threshold are marked 1 and all equal to or below are marked as 0, indicates the standardization of data, and how feature scaling or normalizing is performed. "Output data post-processing" functions typically include the type or manner of: various pruning routines, rule quality processing, rule filtering, rule combination, model combination, or even knowledge integration. Output data post processing acts as a filter for noisy and imprecise knowledge derived by a machine learning model.

In some embodiments, the first network device and the second network device are at least one of: an edge computing device (e.g., 424 of FIG. 4), a cloud node (e.g., 420), a residential gateway, a network switch, a telephone, a set-top box, a television, a home network adapter, and an internet access gateway.

Per block 2107, the first network device is selected to route the client request to. In some embodiments, block 2107 is based at least in part on the client request and the determining of the first set of attributes and the second set of attributes at block 2105. For example, the client request may specify that it needs a particular object detected in a video stream. Responsively, the network device 116 of FIG. 1 may determine, via the resource list 120 that the only network device that has object detection functionality is network device 112. Accordingly, network device 112 is selected to route the request to.

In some embodiments, block 2107 is based at least in part on the comparing, as described above with respect to block 2104. For example, referring back to FIG. 1, the routing determiner 104 may compare, via the resource list 120, network device 112's CPU and memory with network device 106's CPU and memory, as well as their machine learning capabilities. Based on network device 112 having more memory availability, less CPU utilization, and/or a more suitable machine learning model, for example, network device 112 is selected to route the client request to.

Some embodiments additionally refrain from selecting the second network device for the routing. For example, using the illustration above with respect to FIG. 1, network device 116 may affirmatively refrain from selecting network device 106 for the routing based on the comparing or determining that its machine learning capabilities and/or computer resource characteristics are not as suitable to service the client request. Alternatively, some embodiments choose both network devices to service the client request. For example, the first network device can be selected to process information through a first machine learning model, and the second network device can be selected to process other information through a second machine learning model.

Per block 2109, particular embodiments causes the first network device to process the request. In some embodiments, block 2109 is based at least in part on the selecting at block 2107. In some embodiments, block 2109 includes or is preceded by actually routing the client request to the first network device based on the selecting of block 2107.

In some embodiments, the processing of the request of block 2109 includes detecting, at the first network device and via one or more machine learning models host at the first network device, anomalous activity. Examples of this are described with respect to FIG. 6, which describes the diagnostics of connectivity issues, the detection of media content leak, and/or the detection of malicious network intrusion, among other things.

In some embodiments, the processing of the request of block 2109 includes detecting, at the first network device, and via one or more machine learning models hosted at the first network device, device-specific and network-wide physical layer issues. Examples of this are described with respect to FIG. 7, which describes the detection and classification of network impairments, the characterization of sub-network conditions, and the like.

In some embodiments, the processing of the request of block 2109 includes detecting, at the first network device and via one or more machine learning models hosted at the first network device, one or more objects in one or more images. Examples of this are descried with respect to FIG. 9 and/or FIG. 10, which describes detecting and tracking an object, and then zooming in on the object, for example.

In some embodiments, at least partially in response to the routing or processing at block 2109, some embodiments, route the request to a third network device, where the first network device, the second network device, and the third network device are located in a hierarchical network, and where the first network device and the second network device are located in a first layer of the hierarchical network and the third network device is located in a second layer of the hierarchical network, the second layer being further downstream relative to the first layer in the hierarchical network. To be "downstream" means that a layer is configured to configured to process a request later in time later relative to another layer. Examples of this hierarchical network are described with respect to FIG. 2 and FIG. 4. For example, with respect to FIG. 2, the set-top box 203 of FIG. 2 can first process a client request at the CPE layer, and the layer that sits on top, the edge layer, can subsequently process the request via the edge node 209.

In some embodiments, a first portion of the data that is processed at block 2109 is processed at the first network device and a second portion of the data is processed at a third network device. For example, as described above, multiple network devices can be used to service a client request. For instance, the first portion can be video stream data this is to be processed for object detection and the second portion can be packet data to check for malware or other malicious activity.

Per block 2111, some embodiments cause a transmission of data to the client device. In some embodiments, this is at least partially in response to the processing of the client request at block 2109. For example, in response to the first network device detecting and tracking an object via the client request, embodiments causes a transmission of the detected and zoomed-in object (e.g., causing a visual bounding box to appear over the object and enlarging the pixels for a zoomed-in image). In some embodiments, the transmitting of the data includes transmitting an alert, to the client device, of any detection made, for example, with respect to FIG. 6, FIG. 7, FIG. 8, FIG. 9, and/or FIG. 10. For example, the alert can be transmitting an indication or notification of anomalous activity (e.g., a natural language message that malware has been detected).

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

Figure 22:
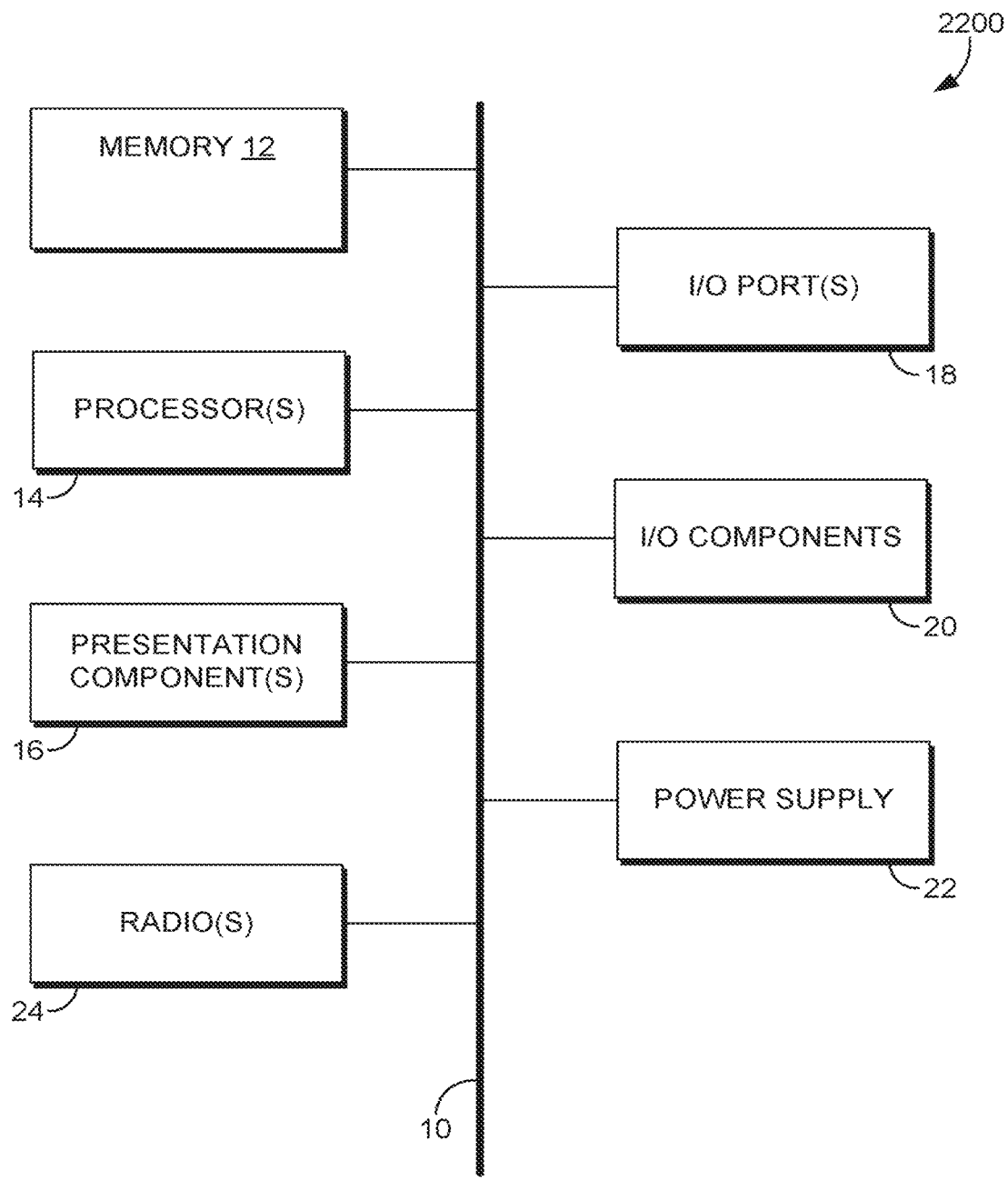
FIG. 22 is a block diagram of a computing device, according to some embodiments.

With reference to FIG. 22, computing device 2200 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 22 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 22 is merely illustrative of an exemplary computing device that can be used in connection with one or more embodiments of the present disclosure. Distinction is not made between such categories as "workstation," "server." "laptop." "handheld device," etc., as each are contemplated within the scope of FIG. 22 and with reference to "computing device."

Computing device 2200 typically includes a variety of computer-readable media. Computer-readable media can be any available media that can be accessed by computing device 2200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology. CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 2200. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 2200 includes one or more processors 14 that read data from various entities such as memory 12 or I/O components 20. Presentation component(s) 16 presents data indications to a user or other device. Other examples of presentation components may include a display device, speaker, printing component, vibrating component, and the like.

The I/O ports 18 allow computing device 2200 to be logically coupled to other devices, including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 2200. The computing device 2200 may be equipped with depth cameras, such as stereoscopic camera systems, infrared camera systems, RGB camera systems, and combinations of these, for gesture detection and recognition. Additionally, the computing device 2200 may be equipped with accelerometers or gyroscopes that enable detection of motion. The output of the accelerometers or gyroscopes may be provided to the display of the computing device 2200 to render immersive augmented reality or virtual reality.

Some embodiments of computing device 2200 may include one or more radio(s) 24 (or similar wireless communication components). The radio 24 transmits and receives radio or wireless communications. The computing device 2200 may be a wireless terminal adapted to receive communications and media over various wireless networks. Computing device 2200 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA. GPRS, GSM, TDMA, and 802.16 protocols.

As used herein, the term "set" may be employed to refer to an ordered (i.e., sequential) or an unordered (i.e., non-sequential) collection of objects (or elements), such as but not limited to data elements (e.g., events, cells, rows, and the like). A set may include N elements, where N is any non-negative integer that is 1 or greater. That is, a set may include 1, 2, 3 . . . N objects and/or elements, where N is a positive integer with no upper bound. A set may include only a single element. In other embodiments, a set may include a number of elements that is significantly greater than one, two, or three elements. For example, various embodiments and examples described herein refer to a "set" of features or a "set" of feature vectors. This refers to one or more features and one or more feature vectors respectively.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method comprising:
receiving a client request to process data via one or more machine learning processes, the client request being associated with a client device;
comparing a first set of attributes associated with a first network device with a second set of attributes associated with a second network device, the first set of attributes and the second set of attributes include one or more computer resource characteristics of a respective network device and one or more machine learning processing capabilities of a respective network device, the one or more machine learning processing capabilities comprising at least one of a machine learning model type hosted on a respective network device, hyperparameters used in a respective machine learning model, output data post-processing functions, and data paths for input and output data flows;
based at least in part on the comparing, selecting the first network device to route the client request to and refraining from selecting the second network device;
based at least in part on the selecting, causing the first network device to process the client request, the first network device comprising a first machine learning core configured to enable end-to-end processing associated with an object, wherein the object represents any logical entity with a unique signature embedded in an ML input data; and
at least partially in response to the processing of the client request, causing a transmission of data to the client device.

2. The method of claim 1, wherein the one or more computer resource characteristics include at least one characteristic of a group of characteristics consisting of: a data transmission rate, processing capacity, transport protocol, latency, bandwidth, memory capacity, neural network types or neural network structures, and security.

3. The method of claim 1, wherein the first network device and the second network device include at least one network device of a group of network devices consisting of: an edge computing device, a cloud node, a residential gateway, a network switch, a telephone, a set-top box, a television, a home network adapter, and an internet access gateway.

4. The method of claim 3, wherein the client device and the first network device or second network device are modules located on a same device.

5. The method of claim 1, wherein the processing of the client request includes, detecting, at the first network device and via one or more machine learning models hosted at the first network device, anomalous activity.

6. The method of claim 1, wherein the request is preceded by an initial control request sent to an operator cloud service, and wherein the first network device and the second network device are configured, by the cloud service, to support ML processing for the client device, and wherein the data for the ML processing are directly sent to the first network device.

7. The method of claim 1, wherein processing results of the ML processing of the data is sent to: the client device for privacy reasons, the cloud service for network or client device diagnostics, and both the cloud service and the client device for service purposes.

8. The method of claim 1, wherein the processing of the client request includes, detecting, at the first network device and via one or more machine learning models hosted at the first network device, one or more objects in one or more images.

9. The method of claim 1, further comprising, at least partially in response to the routing, routing the request to a third network device, wherein the first network device, the second network device, and the third network device are located in a hierarchical network, and wherein the first network device and the second network device are located in a first layer of the hierarchical network and the third network device is located in a second layer of the hierarchical network, the second layer being further downstream relative to the first layer in the hierarchical network.

10. The method of claim 1, wherein a first portion of the data is processed at the first network device and wherein a second portion of the data is processed at the third network device.

11. A system comprising:
a client device configured to transmit a client request to process data via one or more machine learning processes;
a first network device located in a first layer of a hierarchical computer network, the first network device having a first machine learning core; and
a second network device located in at least one of the first layer or a second layer of the hierarchical computer network, the second network device having a second machine learning core, the second network device is configured to determine a first set of attributes associated with the first network device and determine a second set of attributes associated with the second network device, the first set of attributes and the second set of attributes include one or more computer resource characteristics of a respective network device and one or more machine learning processing capabilities of a respective network device; wherein the second network device is further configured to:
based at least in part on the determining of the first set of attributes and the second set of attributes, selecting the first network device to process the client request, and
based on the selecting, routing the client request to the first network device;
wherein the first machine learning core enables end-to-end processing associated with an object, wherein the object represents any logical entity with a unique signature embedded in ML input data, and wherein the first machine learning core is configured to:
detect and classify an object present in the ML input data by detecting a signature associated with the object,
track the object continuously or periodically across a stream of the ML input data, zoom in on the object by scaling associated attributes of the object or detecting additional detailed attributes, and post-process the data by generating results from the detecting, tracking, and zooming and transmitting a notification that applies a particular data-privacy rule.

12. The system of claim 11, wherein the selecting is further based on one or more computer resource characteristics of the first network device and the second network device.

13. The system of claim 11, wherein the one or more machine learning processing capabilities include at least one capability of a group of capabilities consisting of: a machine learning model type hosted on a respective network device, hyperparameters used in a respective machine learning model, input data preprocessing functions, output data post-processing functions, and data paths for input and output data flows.

14. The system of claim 11, wherein the first network device and the second network device include at least one network device of a group of network devices consisting of: an edge computing device, a cloud node, a residential gateway, a network switch, a telephone, a set-top box, a television, a home network adapter, and an internet access gateway.

15. The system of claim 11, wherein the client device is an Internet of Things (TOT) device or an Internet of Everything (IoE) device.

16. The system of claim 11, wherein the first network device is further configured to transmit data to the client device in response to the processing of the client request, wherein the transmitting of the data includes transmitting an alert, to the client device, of the anomalous activity.

17. One or more computer storage media storing computer-useable instructions that, when used by the one or more processors, cause the one or more processors to perform a method, the method comprising:

receiving a client request to process data via one or more machine learning processes, the client request originating from a client device;

determining a first set of attributes associated with a first network device and determining a second set of attributes associated with a second network device, the first set of attributes and the second set of attributes include one or more machine learning processing capabilities of a respective network device, the one or more machine learning processing capabilities comprising at least one of a machine learning model type hosted on a respective network device, hyperparameters used in a respective machine learning model, output data post-processing functions, and data paths for input and output data flows;

based at least in part on the client request and the determining of the first set of attributes and the second set of attributes, selecting the first network device and the second network device to route the client request to; and based at least in part on the selecting, causing the first network device to process a first portion of the data and causing the second network device to process a second portion of the data;

wherein the first network device comprises a first machine learning core, the first machine learning core is configured to enable end-to-end processing associated with an object, wherein the object represents any logical entity with a unique signature embedded in ML input data, and wherein the first machine learning core is configured to:

detect and classify an object present in the ML input data by detecting a signature associated with the object, track the object continuously or periodically across a stream of the ML input data, zoom in on the object by scaling associated attributes of the object or detecting additional detailed attributes, and post-process the data by generating results from the detecting, tracking, and zooming and transmitting a notification that applies a particular data-privacy rule.

18. The one or more computer storage media of claim 17, wherein the selecting is further based on one or more computer resource characteristics of the first network device and the second network device.

* * * * *